United States Patent Office
3,433,413
Patented Mar. 18, 1969

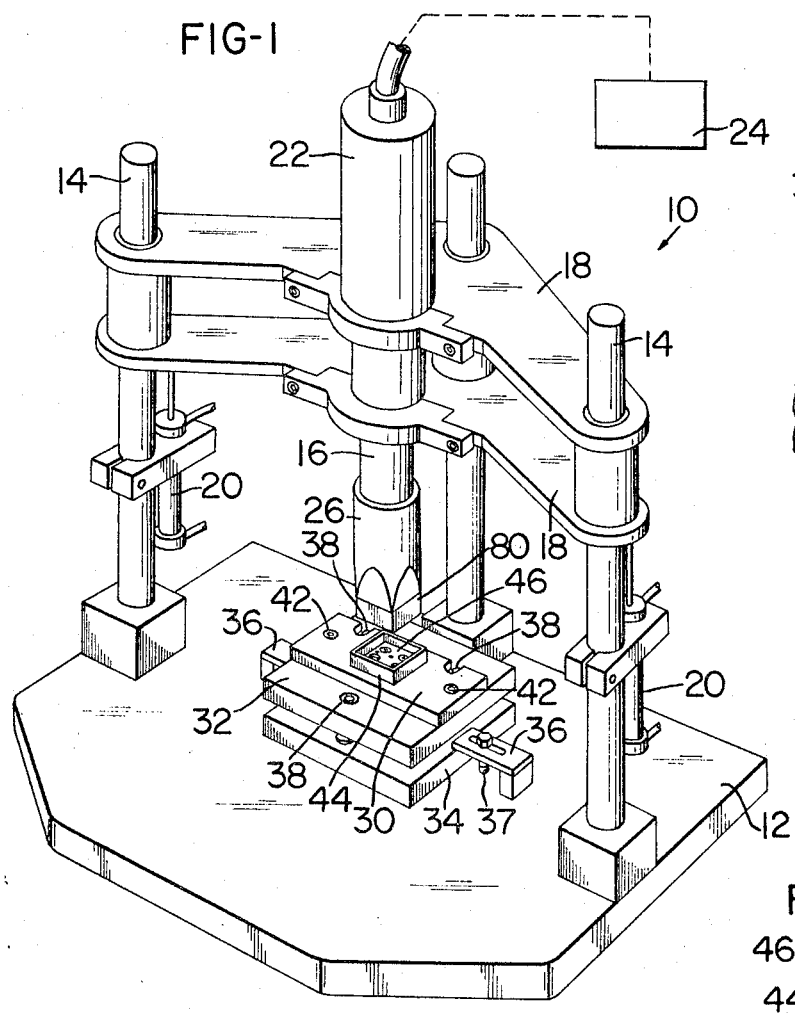

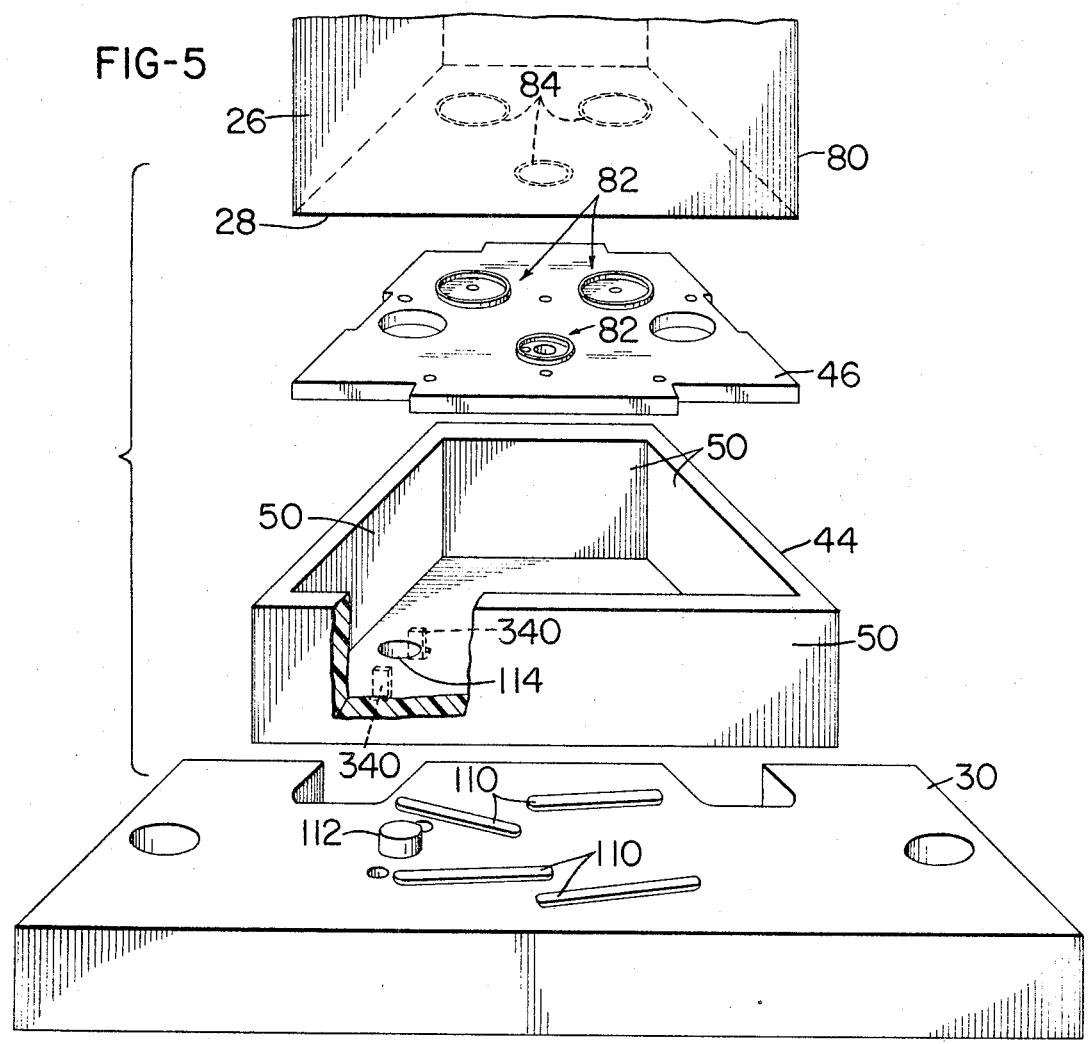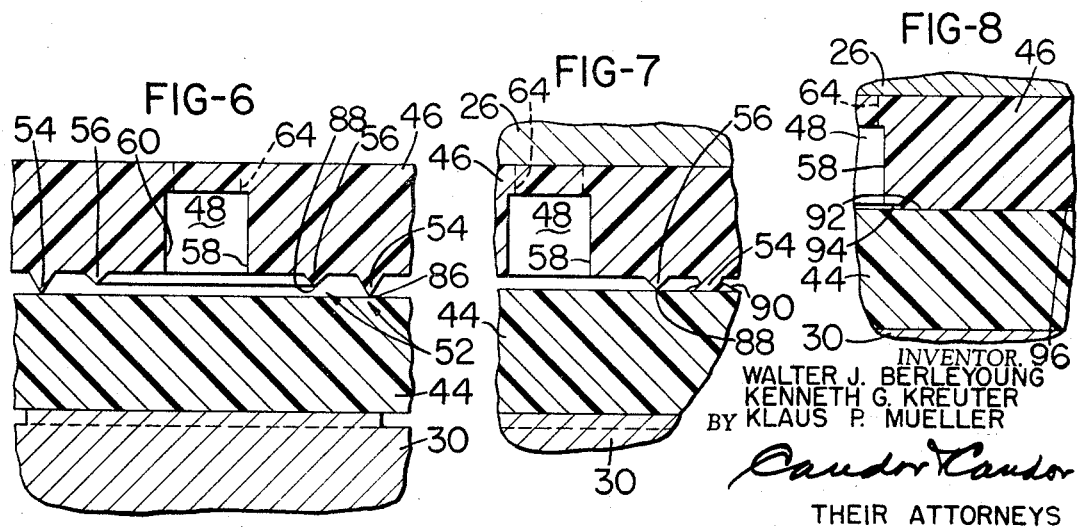

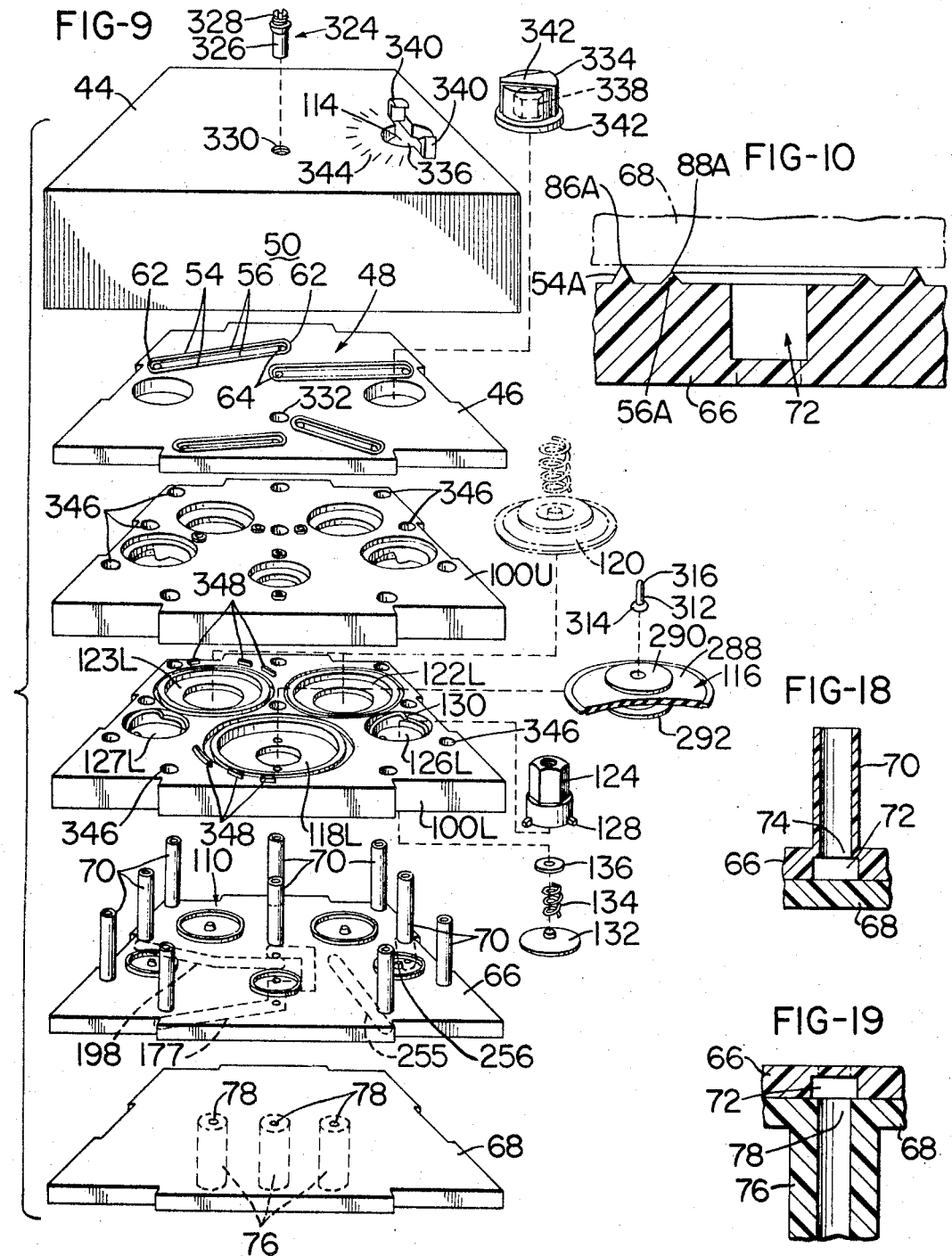

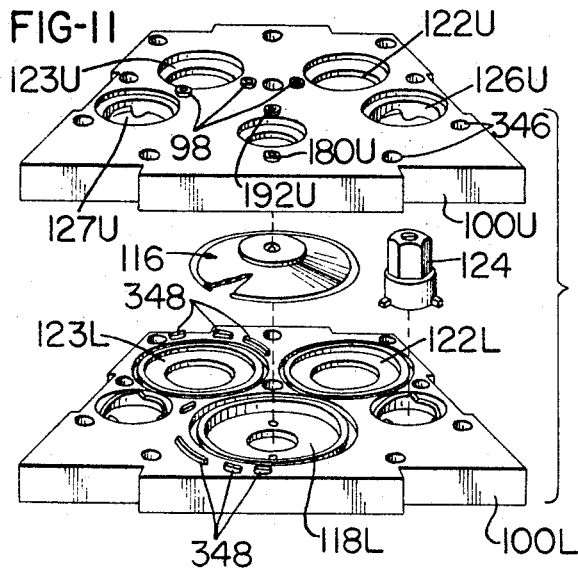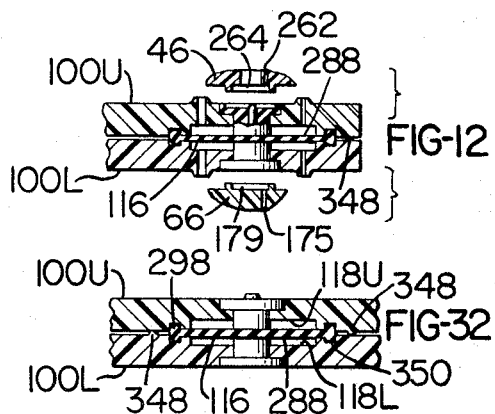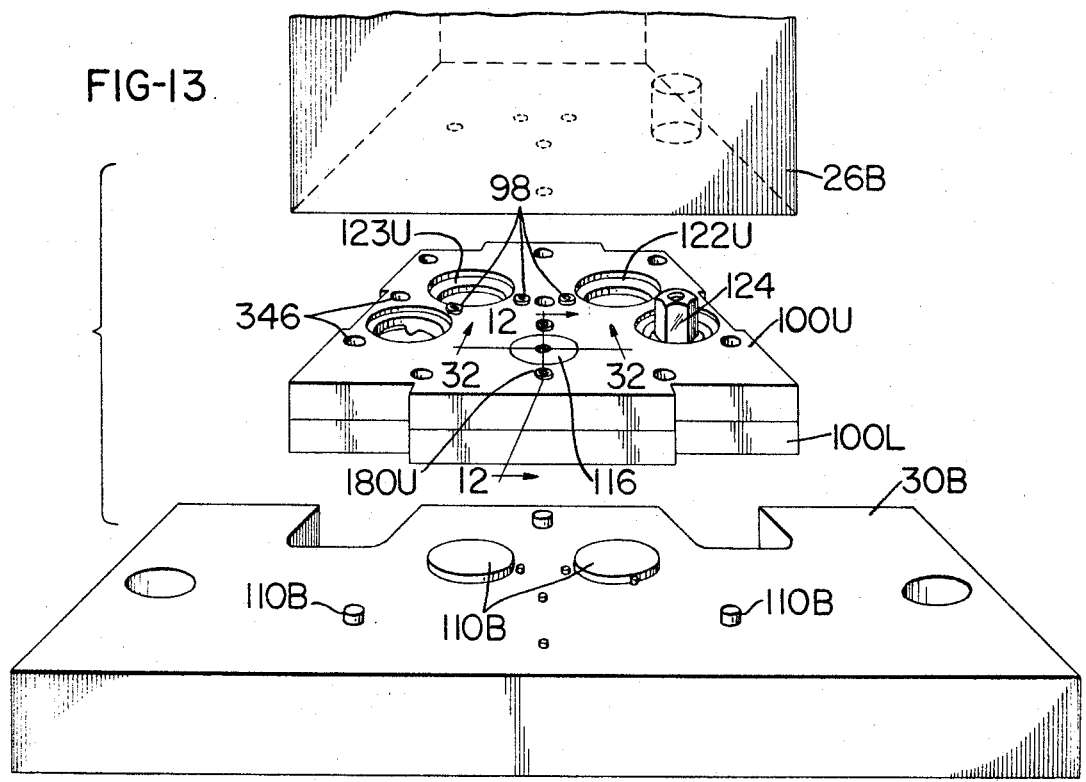

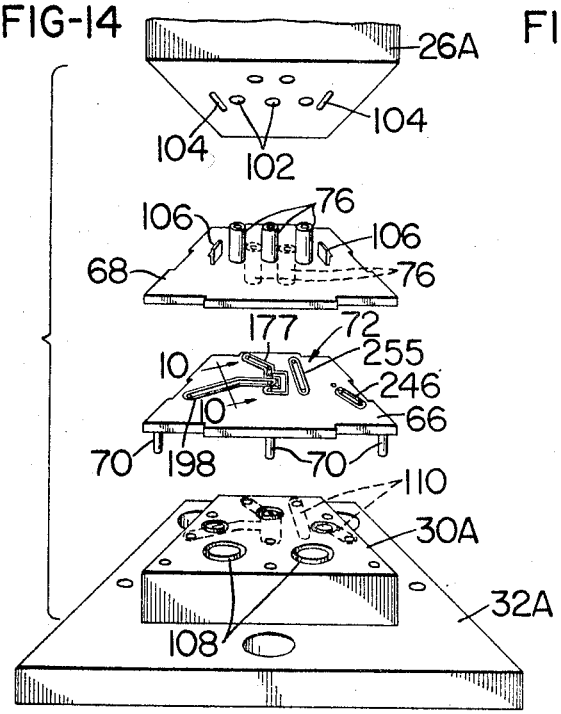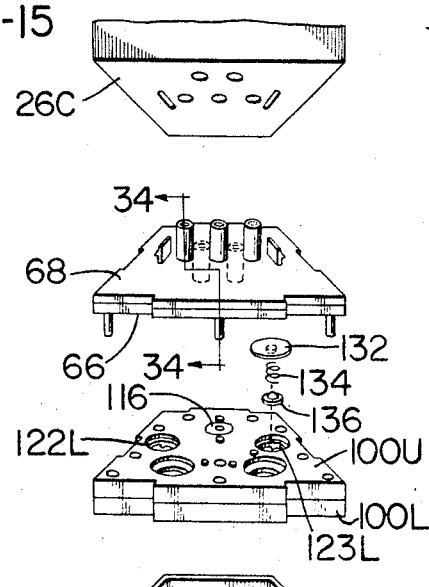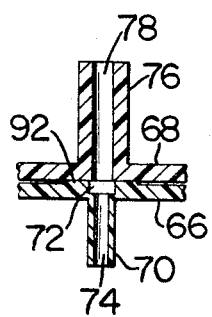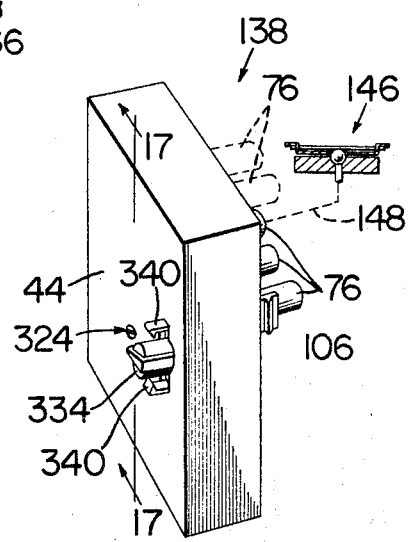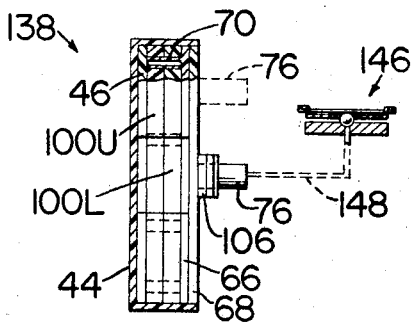

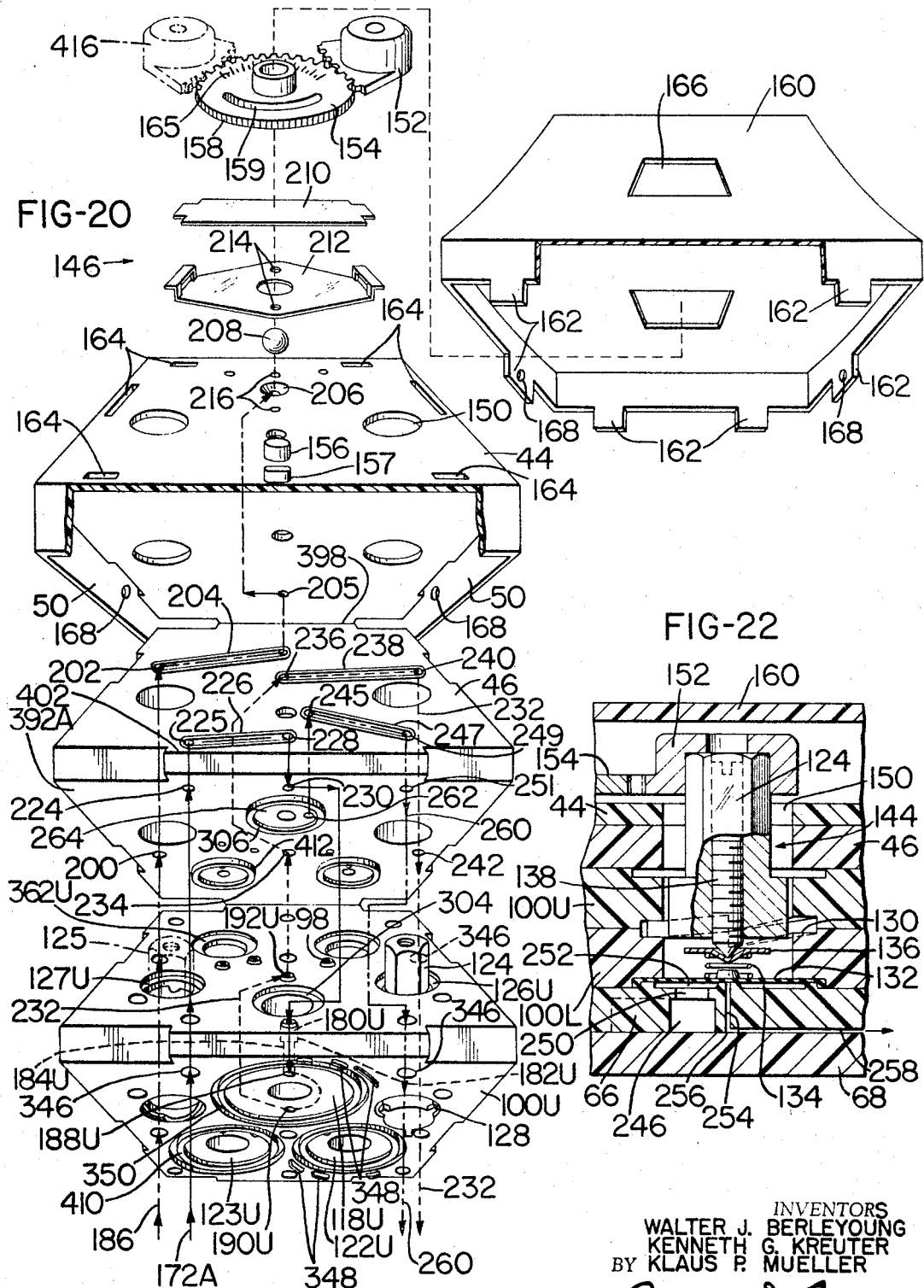

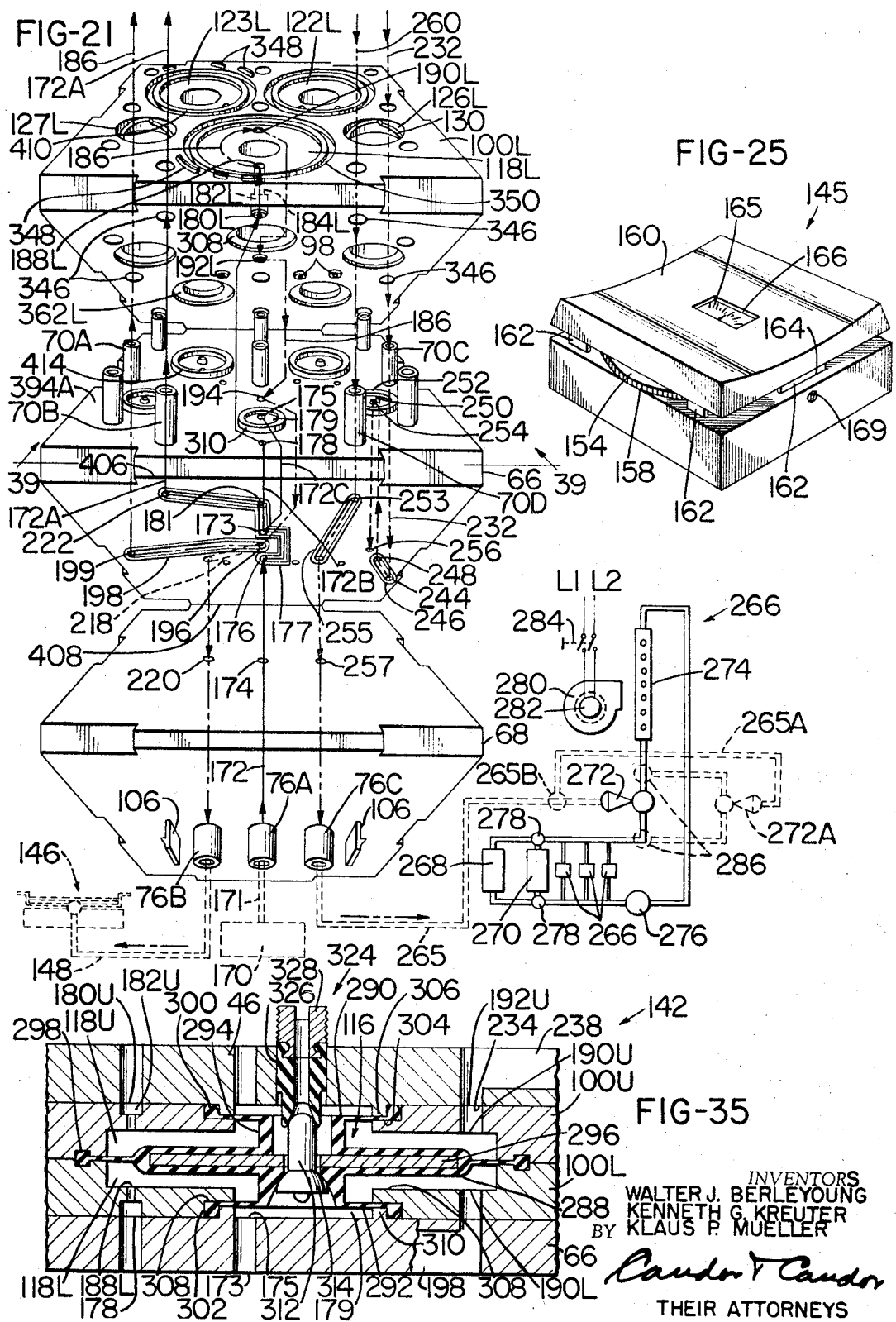

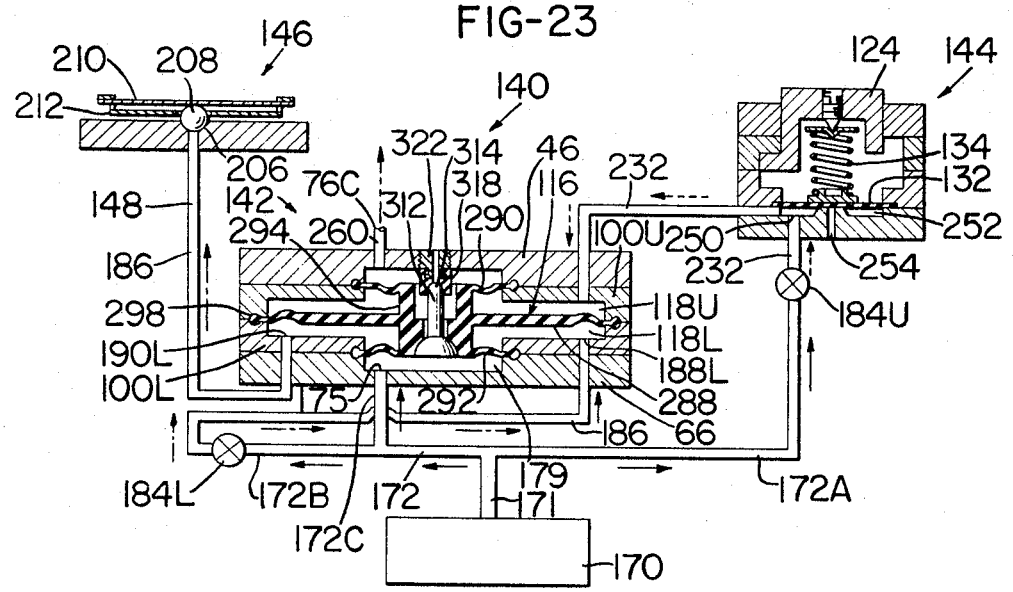
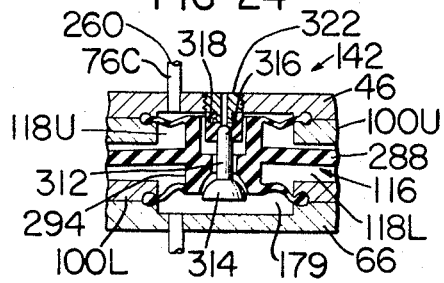
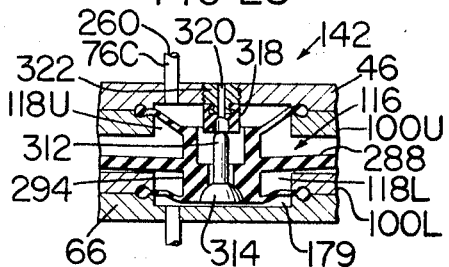
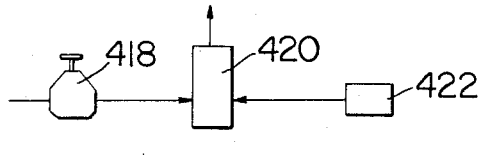
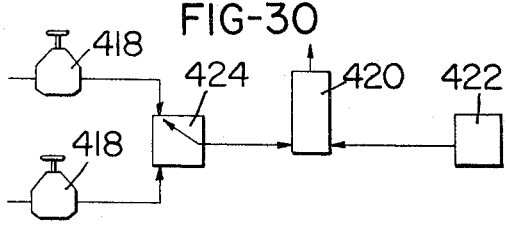
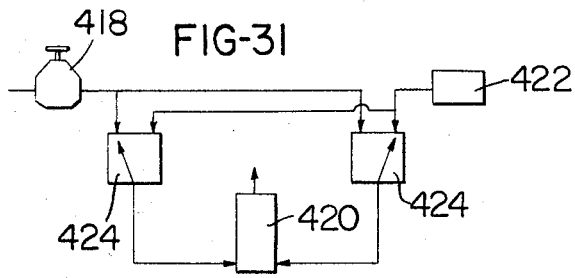

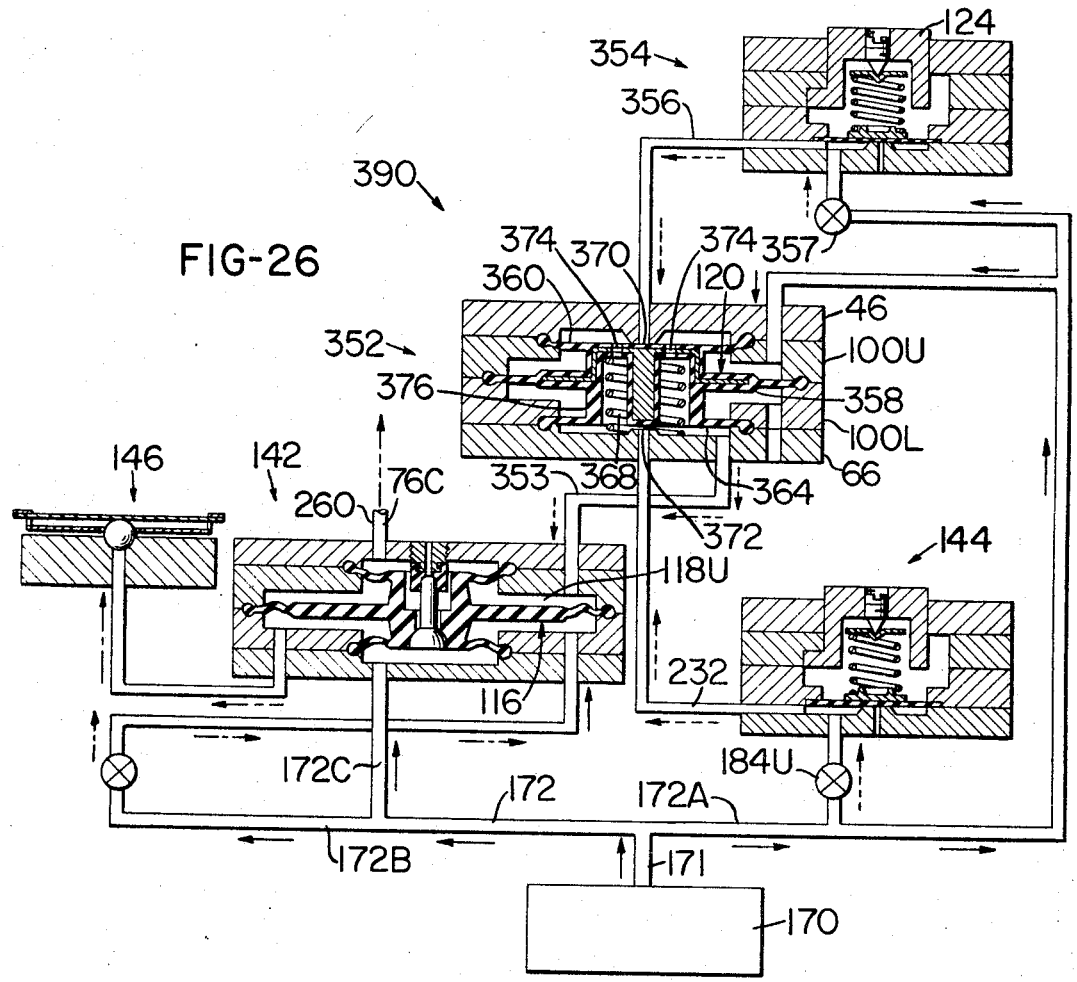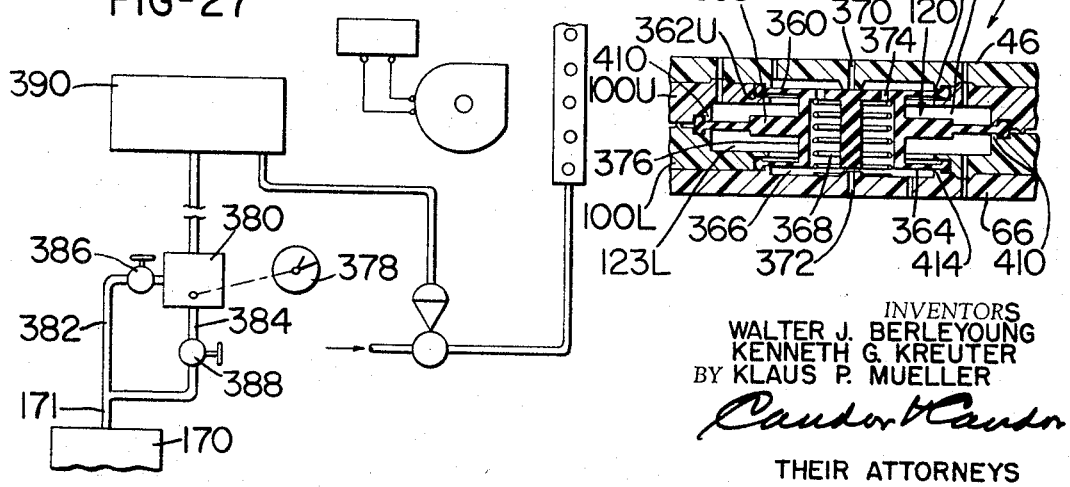

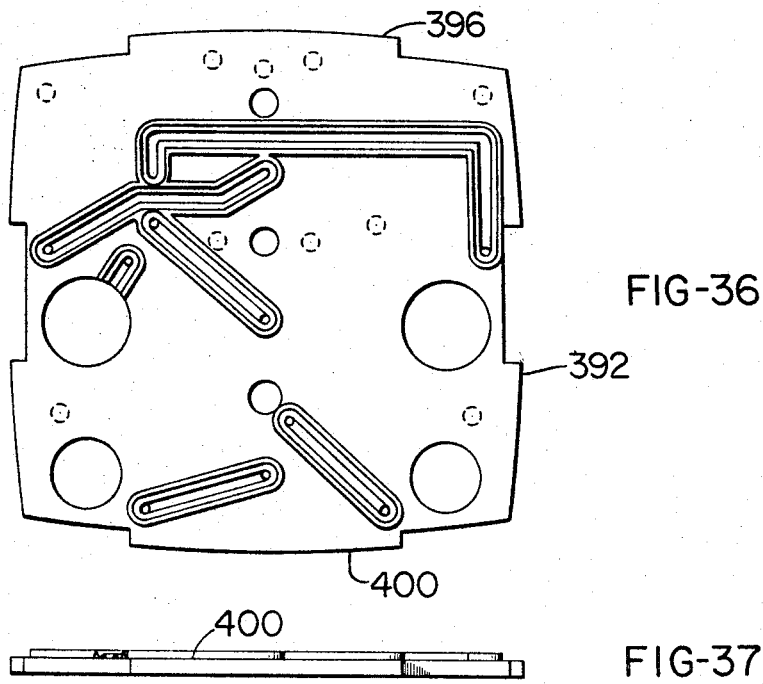
FIG-36
FIG-37
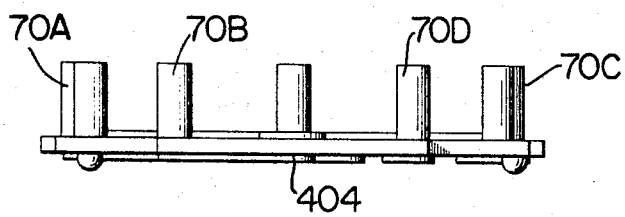
FIG-39
FIG-38
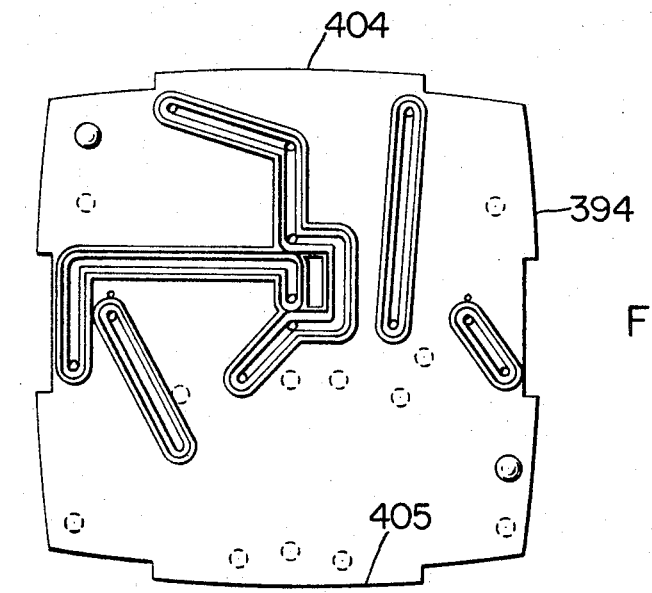

3,433,413
SMALL PNEUMATIC THERMOSTAT
Walter J. Berleyoung, Kenneth G. Kreuter, and Klaus P. Mueller, Goshen, Ind., assignors to Robertshaw Controls Company, Richmond, Va., a corporation of Delaware
Filed Apr. 5, 1967, Ser. No. 628,767
U.S. Cl. 236—82
Int. Cl. G05d 23/00
44 Claims

ABSTRACT OF THE DISCLOSURE

This application discloses the sonic or ultrasonic welding of two plates having a channel on one side of the plates with ridges surrounding the channel so that the crests of the ridges are heated, melted and then solidified on each side of the channel to seal the channel between the plates. Openings are provided in one or both plates which connect the interior of the channel to the exterior of the plates. One or both plates may have tubes aligned with such openings so that the channel between the plates may be connected to other structures by such tubes. This application also discloses a fluid pressure control system enclosed within a unit made of thermoplastic plates sonically welded together to encompass channels, passageways, diaphragms, cams and the like between the plates. This application also discloses the welding of two identical plates with one of the plates rotated at 180°, the plates having a diaphragm cavity facing another diaphragm cavity on the other plate and with sonic ridges adjacent such cavity on only one half of one plate, so that such ridges on said one plate will then engage a flat surface without ridges on the other plate, to promote efficient sonic welding of the plates.

One feature of this invention includes one or more sealed fluid conductive channels between a pair of thermoplastic plates united by sonic welding of the plates. This feature further includes providing ridge means, preferably in the form of two ridges, on each side of such a channel with the crests of the ridge means being first sonically melted and then said substantially all of the ridge means being further sonically melted with the melted material being spread adjacent but slightly away from the channel sides. Thereafter the melted material is solidified by stopping the sonic action so that a relatively flat thin sealing weld is produced between the plates on each side of the ridge. If desired the ends of the channel may be similarly sealed. Openings through either or both of the plates may be connected to the channel or channels for the transfer of fluid and fluid pressure along the channel or channels.

Another feature of this invention includes a fluid pressure controller unit produced by sonically welding together a plurality of thermoplastic plates to form such controller unit. Such unit may include any of a plurality of control components that are contained between and through the plates and on the outside of the plates to provide a compact and effective controller unit. The components may include any of a comparator relay means, a pressure regulator valve means, a temperature to pressure transducer means, a diverting relay means, and channels between said plates and passageways through said plates in a manner to interconnect said components to provide said controller unit.

Another feature of this invention includes one or more diaphragm means held by two similar thermoplastic plates, one of which has been rotated 180° about a horizontal axis, said plates having been sonically welded together by the use of properly placed sonic welding ridges adjacent such diaphragm means.

Other features are apparent from this description, the claimed subject matter and/or the accompanying drawings in which:

FIGURE 1 is a diagrammatic perspective of a sonic or ultrasonic apparatus for welding together the thermoplastic plates of this invention.

FIGURE 2 is a front elevation of a portion of FIGURE 1.

FIGURE 3 is an exploded perspective view of some of the parts shown in FIGURES 1 and 2.

FIGURE 4 is an assembled cross section taken along the lines 4—4 of FIGURE 3.

FIGURE 5 is an exploded, enlarged, perspective view of a portion of FIGURE 1.

FIGURE 6 is an enlarged cross section of the plates shown in FIGURE 5 just touching each other, and ready to be sonically welded together.

FIGURE 7 is a view similar to FIGURE 6, but showing an initial phase of the sonic welding of the outer ridge which is adjacent a channel in the upper plate that is being welded.

FIGURE 8 shows a later state of the sonic welding operation, in which the original ridges have been sonically melted and distributed and joined together, ready to solidify a welded band adjacent the channel.

FIGURE 9 is an exploded perspective view of a plurality of plates that are to be sonically welded together to produce an embodiment of a fluid pressure controller unit according to this invention.

FIGURE 10 is an enlarged cross section taken along the line 10—10 of FIGURE 14 and showing ridges adjacent the sides of a channel about to be sonically welded somewhat similarly to FIGURES 6, 7 and 8.

FIGURE 11 is a perspective view of two similar plates to be welded together, with one of the plates having been rotated 180° about a horizontal axis.

FIGURE 12 is a diagrammatic cross section along the line 12—12 of FIGURE 13 and showing a diaphragm construction secured in the two plates shown in FIGURES 13 and 11.

FIGURE 13 is a diagrammatic exploded view of the apparatus for welding the two plates of FIGURE 11.

FIGURE 14 is an exploded diagrammatic perspective view of an apparatus for sonically welding another pair of thermoplastic plates.

FIGURE 15 is a diagrammatic exploded view of an apparatus for sonically welding all of the plates shown in FIGURE 9, after three pairs of plates have been previously welded together as shown in FIGURE 5, FIGURE 13 and FIGURE 14.

FIGURE 16 is a diagrammatic side perspective view of the control unit produced by the welding operation of FIGURE 15.

FIGURE 17 is a view partly in elevation, and partly in cross section, such section being taken along the line 17—17 of FIGURE 16.

FIGURE 18 is an enlarged cross section of portions of the two lower plates of FIGURE 9 taken where an upward tube and channel are connected together.

FIGURE 19 is a view similar to FIGURE 18, but taken along a line where the lower plate is connected to a downward tube.

FIGURE 20 is a diagrammatic view of another embodiment of a control unit, FIGURE 20 showing the upper three plates exploded by separating the upper and lower surfaces, to show both of said upper and lower surfaces of said plates.

FIGURE 21 is a diagrammatic view somewhat similar to FIGURE 20, and showing the three lower plates of such unit similarly exploded with their upper and lower surfaces exploded away from each other and in perspective.

FIGURE 22 is an enlarged cross section of the pressure reducing valve mechanism included in the embodiments of FIGURES 9 and 20, 21.

FIGURE 23 is a diagrammatic view showing the components and the flow lines which are assembled in the units of FIGURES 9 and 20, 21.

FIGURE 24 is a cross section of a portion of FIGURE 23 and showing the comparator diaphragm construction in its uppermost position.

FIGURE 25 is a perspective side view of the unit which is assembled according to FIGURES 20, 21.

FIGURE 26 is a diagrammatic view, somewhat similar to FIGURE 23, but showing a system adapted to perform control operations differently during night time from the control operations of day time.

FIGURE 27 is a diagrammatic view showing how the system of FIGURE 26 may be connected to a multiple pressure air supply system and to a local atmosphere heat exchange system.

FIGURE 28 is a view similar to FIGURE 24, but showing the diaphragm construction in its lower position.

FIGURE 29 is a diagram showing how the components of the embodiments of FIGURES 9, and 20, 21 are assembled together.

FIGURE 30 is a diagram showing how the components of the system of FIGURE 26 are assembled together.

FIGURE 31 is a diagram showing how an additional component is added to FIGURE 30 to produce a manually controlled system similar to FIGURE 26.

FIGURE 32 is a view somewhat similar to FIGURE 12, but taken along the line 32—32 of FIGURE 13 to show how the welding ridges of the lower plate are limited to the left-hand half of the lower plate and how the welding ridges of the upper plate are limited to the right-hand half of the upper plate for proper sonic welding of such ridges against flat surfaces.

FIGURE 33 shows how the valve seat for the comparator of FIGURE 23 can be threaded into the upper case member, for adjustment of such valve seat after the controller unit has been welded together.

FIGURE 34 is an enlarged cross section taken along the line 34—34 of FIGURE 15.

FIGURE 35 is an enlarged cross section of the comparator as built into the unit of FIGURES 20 and 21.

FIGURE 36 is a plan view of the lower surface of an upper channel plate to be substituted for the upper channel plate of FIGURE 20, when the unit to be produced includes the system of FIGURE 26.

FIGURE 37 is a side elevational view from the bottom of FIGURE 36.

FIGURE 38 is a plan view of the lower channel plate to be substituted for the lower channel plate of FIGURE 21, to produce a unit having the system of FIGURE 26.

FIGURE 39 is a side elevational inverted view of the plate of FIGURE 38 taken from the top of FIGURE 38 and also taken as it would appear from line 39—39 of FIGURE 21.

FIGURE 40 is a cross section of a diverting diaphragm construction as secured in the unit of FIGURES 20, 21, if used.

Certain words may be used in this specification and in the claimed subject matter which indicate direction, relative position, and the like. Such words are used for the sake of brevity and clearness. However, it is to be understood that such words are used only in connection with the illustrations in the drawings, and that in actual use the parts so described may have entirely different direction, relative position and the like. The examples of such words are "vertical," "horizontal," "upper," lower," etc.

The feature of forming a sealed fluid conductive channel means between a pair of thermoplastic plates will first be described.

A sonic welding apparatus 10 is shown in FIGURE 1, which is suitable for forming the sealed fluid conductive channel means between such pair of thermoplastic plates according to this invention. Certain parts of this apparatus may be purchased, for example, from Branson Instruments, Incorporated, which has a place of business at Danbury, Conn., or other similar supplier of such equipment.

This apparatus may include the pedestal 12, vertical posts 14, vertically movable horn support 16, which horn support is vertically and movably supported by the platforms 18 which are vertically movable by the air cylinder moving means 20, 20. A sonic power unit 22, and a power supply unit 24 may be provided to produce the desired sonic vibrations in the sonic horn 26. The horn 26 is tailored by the supplier at the design and request of the user.

Such horn 26 is provided with a lower surface 28 which is made substantially perfectly perpendicular to the vertical axis of the horn 26.

The names "sonic" and "ultrasonic" are used interchangeably herein, to indicate a relatively high frequency range of vibrations suitable to produce the welding operations herein disclosed. For example, the sonic or ultrasonic vibrations in the horn 26 may be in the order of from 4000 to 20,000 cycles per second, more or less.

In FIGURE 1 a die plate 30 is held absolutely parallel to the under surface 28 of the horn 26 by means of an adjustable plate 32 which is carried by the base 34 which base is clamped to the pedestal 12 by means of clamps 36 which are held down by screws 37. The adjustable plate 32 is secured to the base 34 by means of three screws 38 which pass freely through the plate 32 and are tapped into the base 34. The plate 32 and screws 38 are held in place by the lock nuts 40. The screws 38 have heads 39 each of which head bears down on a shoulder 41 to hold the plate 32 against the upper lock nut 40.

However, any other arrangement of mounting the die plate 30 on the pedestal 12 may be used which insures the placing of the die plate 30 absolutely parallel to the lower surface 28 of the horn 26.

The apparatus 10 illustrated in FIGURE 1 may be used sonically to weld all of the plates herein disclosed, with a proper change of the horn 26 and die plate 30. The apparatus shown in FIGURES 1–8 may be used to sonically weld the thermoplastic plate or case member 44 which is a plate member with side walls 50. Such case member 44 is shown with the side walls upward in FIGURES 1, 3, and 5, and is shown inverted with the sidewalls downward in FIGURE 9. This member may be referred to as an upper case member in further descriptions of control units of this invention.

The flat part or plate of case member 44 may be sonically welded to another plate 46, which will be referred to as the first plate or upper channel plate in further descriptions of this plate in connection with control units of this invention.

Such plates 46 has a plurality of grooves which are generally indicated as 48 in FIGURE 9 which are on the upper side in FIGURE 9, but are on the under side of plate 46 in FIGURES 1, 3 and 5–8. When air circuits are later described particular ones of these grooves will be designated by specific reference numerals.

Any one of these grooves or channels 48 (and substantially all of the grooves herein disclosed) may be provided with ridge means 52, FIGURE 6, which may be in the form of an outer ridge 54 that is "higher" than the inner ridge 56 of such pair of ridges 54, 56. The ridges 54, 56, shown in FIGURES 6, 7 and 8, are directed downwardly, but the use of the word "higher" is intended to disregard the inverted nature of the ridges, for convenience in description. These ridges are shown adjacent the side 58 of the groove or channel 48.

A second set of ridges correspondingly numbered 54 and 56 are adjacent the other side 60 of the groove or channel 48.

The ridge 54 may have sides similar to an equilateral triangle, with its sides having a 60 degree angle, more or less. The ridge 56 may also have sides similar to an equilateral triangle, with its sides being at 90 degrees to each other, more or less.

These ridges 54 and 56 extend along the entire length of the channel 48 and may be joined at the ends of the channel as indicated at 62, FIGURE 9, to maintain the ridge means completely around the ends and seal also the ends of the channels. That is, the ridges are U-shaped and continue completely around the ends of the channel 48.

Either or both of the plates which are adjacent the groove or channel 48 may have openings through the plates, which openings are connected to such channel 48. For example, the plate 46, shown in FIGURES 6–9, may have openings 64 at any place along the channel 48. This is indicated in dotted lines at 64 in FIGURES 6, 7 and 8. In the particular instance shown in FIGURES 1–8, the plate or case 44 does not have any openings, similar to 64. However, as later to be more fully described, in connection with FIGURES 17 and 18, the pair of plates 66 and 68 have channels 72 have respective openings 74, 76 on each of the plates, and have oppositely directed tubes 70 and 76 connected to such openings. The plate 66 is similarly sonically welded to the plate 68. These plates are also shown in FIGURE 14, where they are inverted during the sonic welding operation diagrammatically shown in FIGURE 14. Any of the channels 72 shown in the plate 66 can be connected to any of the small tubes 70 through the openings 74. Likewise, the channel 72 may be connected to any of the larger tubes 76 which may be connected with the plate 68. The tubes 70 and 76 may be molded integrally with the respective plates 66 and 68. The tubes 76 may be connected by the opening 78 in the plate 68 with the channel 74. The channels in the plate 66 may be provided with ridges and may be sonically welded in the same manner as described in connection with plates 44 and 46 of FIGURES 1–8.

Returning to FIGURES 1–8, the sonic horn 26 of FIGURES 1 and 2 has sides 80 which telescope sufficiently closely with the sides 50 of the plate 44 properly to align the plates 44 and 46 for the sonic welding operation. The horn 26 is slowly telescoped so that the lower surface 28 of the horn engages the upper surface of the plate 46. If there are any upstanding protrusions in the plate 46, the horn 26 is provided with proper indentations or grooves to avoid direct contact with such protrusions. For example, the plate 46, FIGURE 5, may have three circular ridges, generally indicated as 82, which will later engage diaphragm rims to seal such rims, as later described. The horn 26 may have matching grooves 84, which loosely straddle the ridges 82 which prevent any welding action of the ridges 82 to the horn 26.

The lower surface 28 of the horn 26 has a relatively large area, where it engages the top of the plate 46. Therefore there is no concentrated welding area between the horn 26 and the plate 46 to produce any welding between the horn 26 and the plate 46. However, the sonic vibrations from the horn 26 are transferred to the crests 86 and 88 of the ridges 54 and 56 to produce a concentrated frictional welding engagement between the ridges 54 and 56 and the flat surface of the plate 44, as illustrated in FIGURES 6, 7 and 8.

The first sonic welding action which will take place between the ridges 54 and the plate 44, is diagrammatically indicated in FIGURE 6, where the crest 86 is just touching the surface of plate 44. When the horn 26 is pressed against the plate 46, as in FIGURE 7, the frictional vibration produces a melting action at the end or crest of the ridges 54, as shown at 90 in FIGURE 7, in a diagrammatic manner only. The melted material 90 flows along the upper surface of the plate 44 and between the ridges 54 and 56. When the ridge 56 engages the plate 44, as shown in FIGURE 7, a sonic melting action is started, so that the melted material at the crest 88 will start to flow on either side of the ridge 56. However, the melted material which will be produced at the ridge 56 will tend to flow toward and merge with the melted material 90 from ridge 54 because of the mutual wetting action. As the plate 46 is further pushed down, as indicated in FIGURE 8, the melted material from the ridges 54 and 56 spreads out into a wide zone 92. This melted material will solidify into a relatively wide welding band along each side of the groove 48 to completely seal the groove 48 from all but a very small space 94 which may be formed between the plates 44, 46, adjacent the groove 48. The plates 46 and 44 are also slightly spaced apart, as indicated at 96, FIGURE 8, throughout most of the area between the two plates, at all places between the two plates, except where there is a concentrated sonic welding action, similar to that produced at 92 by the ridges 54 and 56.

It is thus to be seen that by the use of the two ridges 54 and 56 an effective sealing weld is obtained on each side of channel 48 without any danger of the molten material flowing into the conduit 48. This advantage is obtained by the fact that the initial melting action which is produced at the crest 86 of the taller and outer ridge 54, produces a wetting action which spreads to or near the ridge 56 and induces a flow of molten material from the ridge 56 towards the ridge 54 eventually to produce the flat, thin weld 92.

Substantially the same action occurs when the ridges are directed downwardly, as in FIGURES 6, 7 and 8, or whether the ridges are directed upwardly, as in FIGURE 10.

FIGURE 10 is taken along the lines 10—10 of FIGURE 14 wherein the plate 66 is in its inverted welding position as compared to its assembling position in FIGURE 9. Likewise the base plate 68 is in its inverted welding position and above the plate 66 in FIGURE 14, as compared to the assembling position shown in FIGURE 9. In FIGURE 14 the die plate 30A corresponds to the plate 40 of FIGURE 1 and the adjustable plate 32A corresponds to the adjustable plate 32 of FIGURE 1. The horn 26A is provided with indentations 102 to receive the tubes 76 of the plate 68. The horn 26A may also have indentations 104 to receive the mounting hooks 106. The die plate 30A is provided with circular grooves 108 to receive the rings generally indicated at 110 on the plate 66, which are shown in FIGURE 9. The channels 72 FIGURES 10 and 14, have ridges 54A, 56A substantially the same in function and welding action as previously described for ridges 54 and 56 in connection with FIGURES 1 through 8, except that ridges 54A and 56A are upwardly directed during the welding action. However, the welding action is substantially the same in both embodiments. In the embodiment of FIGURES 14, 18 and 19 channels 72 are provided which have openings 74 which are connected with one or more of the small tubes 70. The channels 72 are also connected to openings 78 in the plate 68, which are connected to the large tubes 76 so that fluid can flow from a large tube 76 through an opening 78 to the channel 72 and then through the opening 74 into the small tube 70, and vice versa.

The back-up plate or die plate 30, and the corresponding other die plates 30A, 30B, etc., have protrusions 110 which intensify the sonic vibrations at the point where the ridges and channels are located, so that the welding action is intensified locally at the ridge portions. Similar protrusions are provided at any other places where a localized welding action is required. Also, the plate 30, FIGURE 5, has a pin 112 which enters the opening 114 in the plate 44, FIGURE 5, initially to locate the plate 44 on the die plate 30.

By way of example, the following dimensions have been found to provide satisfactory welds of the character herein described. The outer widest dimension of the case 44 is 2 inches, more or less, and the inner length of the side walls 50 is ½ inch, more or less. The thickness of the material of the cover or case 44 is from .066 to .072 inch more or less. While the sides of the plates have been illustrated by straight lines, such sides may be slightly bowed, if desired. The channels 48 are 0.31 inch wide and .031 inch deep, more or less. The outer rigdes 54 have their crests 86 at a distance of .140 inch from each other, or .070 inch from the central axis of the channel 58, more or less. The inner ridges 56 have their crests 88 .096 inch apart or .048 inch from the central axis of the channel, more or less. The "height" of the ridge 54 is from .006 to .008 inch from the surface of the plate 46 to the crest 86, more or less. The "height" of the inner ridge 56 is from .004 to .006 inch from the surface of the plate 46 to the crest 88, more or less. The maximum width of the plates which go inside the side walls 50 of the case 44 is 1.875 inches, more or less.

Another typical sonic or ultrasonic welding action takes place as shown in FIGURES 9, 11, 12, 13, 20, 21 and 40 in which two identical mid-plates or central plates 100L and 100U are welded together with mutually inverted surfaces. One of these plates is rotated 180° about a horizontal axis with respect to the other plate before the welding action. These mid-plates or central plates each has a comparator diaphragm construction 116, FIGURE 9, inserted between the plates 100L and 100U in the comparator diaphragm matching cavities 118L and 118U which are shown in FIGURES 9, 11–13, 20, 21 and 35. The two plates 100L and 100U may also receive one or two diverting diaphragm constructions 120, FIGURES 9 and 40, in the diverting diaphragm construction cavities 122L, 122U, 123L and 123U, FIGURES 20 and 21. The plates 100L and 100U also may receive between them a pressure regulator cam 124, or a pair of such cams 124 and 125, FIGURES 20 and 21, in the pressure regulator cam openings or cavities 126L, 126U, 127L and 127U. The cam 124 of each cam 124, 125 has cams or lugs 128, which are received in the spiral groove constructions 130 between the two central plates 100U and 100L.

For cam 124, or each cam 124 and 125, a pressure regulator diaphragm 132, FIGURE 22, is secured between the lower central plate 100L and the plate 66, with a spring 134 and a washer 136 being secured therein. An adjusting screw 138 is located in the cam 124, and/or cam 125 by turning of which screw 138 a calibration may be obtained.

The central plates 100L and 100U are welded together, as shown in FIGURES 11, 12 and 13, by placing the plates on a die plate 30B which can be supported on an adjustable plate corresponding to 32 of FIGURE 1. The components just named, that is the components 116, 120, 124, may be placed between the plates 100L and 100U before the welding operation. Then the sonic horn 26B is brought down to cause the plates to be welded together. Suitable protrusions 110B may be provided on the die plate 30B to concentrate the welding action between the plates 100L and 100U. These welding actions are not between ridges for channels, however, but are between welding ridges to be described which may be placed on the plates 110 to cause local welding actions between the two plates. Thereafter the horn 26B is brought down and caused to weld the plates 100L and 100U together.

The tubes 70 on the plate 66 are molded on said plate or are secured thereto in any other manner and have openings in the tubes, which are aligned with openings in the plate 66, such openings being shown, for example, in FIGURE 34, which is a cross section taken along the line 34—34 of FIGURE 15, and in which a tube 70 is indicated to be possibly aligned with the larger tube 76. In FIGURE 34, the tube 70 is also shown to be aligned with a channel on the plate 66. The tubes 70 extend through openings 346 properly distributed in the plates 100L and 100U. After these plates have extended through the plates 100L and 100U, through the openings 346, the upper ends of the tubes 70 engage the bottom of the plate 46, in FIGURE 9, and as also indicated in FIGURE 17. This action not only provides passageways, when desired, by providing connections to openings in the plate 46, but also aids in welding the plates together at the ends of such tubes 70.

After the various plates have been welded together in pairs, as shown in FIGURES 1, 5, 13, 14, then these welded plates are welded in a group, as shown in FIGURE 15, between the back-up plate or die plate 30C and the horn 26C, so that the entire group is welded together into a fluid pressure controller or unitary construction, which may be of the character shown at 138, FIGURE 16, which contains a comparator diaphragm construction 116, a pressure regulating construction including the cam 124 and diaphragm 132 but does not contain or carry a sensor construction to be described, and does not contain any diverting relay diaphragm such as 120 and also later to be described.

The thermoplastic plates 68, 66, 100L, 100U, 46 and 44 may be assembled and sonically welded together to produce unitary pressure controller units, such as diagrammatically shown in FIGURES 16, 17 and 25. These units may incorporate any or all of the pressure and temperature regulating components and connecting passageways of control systems disclosed herein or disclosed in the copending application of Kenneth G. Kreuter and Klaus P. Mueller, Serial No. 594,851, filed Nov. 16, 1966.

Those units, as shown in FIGURES 16, 17 and 25, for example, are surprisingly small and effective. Such units may be in the order of two inches wide along their sides and from about ½ inch to about 1 inch in thickness.

*The pressure controller units*

Various pressure controller units may be made according to this invention.

By way of example, the pressure controller unit 138 of FIGURES 16 and 17 may be made to incorporate part of the system 140 of FIGURE 23. The comparator relay 142 and the pressure regulator valve 144 of the system 140 are incorporated in the box-like unit 138 and the temperature sensor or temperature sensing element 146 may be supported remotely from the unit 138. The system 140 of FIGURE 23 shows the components 142, 144 and 146 as separate members interconnected by conduit-like members and restrictors. The system of FIGURE 23 is substantially similar to a system shown in the application of Kreuter and Mueller to which application reference is made for a more detailed descripiton of such system and of the components 142, 144 and 146. However, according to this invention, the components 142 and 144 are assembled and sonically welded with proper interconnecting channels, restrictors, and the like into the pressure controller unit 138 of FIGURES 16 and 17. This unit 138 is suitable for installation on a wall or the like, and is interconnected with the sensor members 146 by a pipe construction 148. The sensor member 146 may be mounted either closely adjacent to the controller unit 138 or as remotely as desired. The sensor 146 may be supported on a wall or any other support desired.

Alternatively, all of the components 142, 144 and 146 of the system 140 of FIGURE 23 may be completely assembled as a unit 145, FIGURES 20, 21 and 25. The sensor member 146 of FIGURE 23 is assembled on the upper case member 44 of FIGURE 20. Also the cam 124 of the pressure regulator valve 144 of FIGURE 23 is extended out through the opening 150 of case or plate 44, FIGURES 20 and 22. A suitable geared lever member or cap 152 is placed and secured over the end of the cam 124. An adjusting geared disc 154 is mounted on the stub shaft 156, FIGURE 20, which is carried by the case 44 and engages and adjusts the geared cap 152. This adjusts the pressure regulating valve 144 which is assembled within the unit as shown in FIGURE 22. The disc 154 is knurled at 158. The disc 154 has a slot 159 which is received by the flat pin 157 on case 44. The slot 159 limits the length of rotation of the disc 154.

An upper outer casing or cover 160, FIGURES 20 and 25 is secured on top of the case or plate 44, FIGURES 20 and 25 to cover the sensor 146 on the cap 152. The cover 160 has downward legs 162 that are secured in the slots 164 in case 44.

The disc 154 may have a suitable scale 165 to indicate the pressure adjustment of the pressure regulating valve 144. This scale 165 is visible through the window 166.

Any suitable fastening means may be provided to hold the cover 160 on the case 44. For example, screw openings 168 may be provided in some of the legs 162 and sides 50, FIGURE 20, to receive suitable screws 169, FIGURE 25, which removably retain the cover 160 on the case 44, if desired.

FIGURES 20 and 21 are respectively upper and lower parts of a diagrammatic, exploded, bellows or accordion-like, view. This view shows the upper and lower surfaces of the thermoplastic plates 68, 66, 100L, 100U, 46 and 44 exploded away from each other about the front edges of the plates. Consequently both the upper and lower surfaces of the plates are shown in perspective extending away from the observer.

These plates are so formed that they may be assembled and sonically welded to produce a limited unit that incorporates only a few of the components of the systems. Therefore only a few of the cavities, passageways, tubes and channels are utilized to produce such a limited unit. The unit 138 of FIGURE 16 is an example of such a unit.

The more comprehensive unit 145 of FIGURE 25 incorporates the sensor 146 of FIGURE 23 in addition to the components 142 and 144 which are incorporated in the more limited unit 138. FIGURES 20 and 21 include air connection lines to show the connections that would be used to produce a unit 145 which would have such components 142, 144 and 146.

However, even more comprehensive units similar in outward appearance to unit 145 of FIGURE 25 may be produced from the plates of FIGURES 20 and 21. Such more comprehensive units can incorporate substantially all of the components of more comprehensive systems than the system of FIGURE 23, such as the components of the day and night system of FIGURE 26.

In general, such more comprehensive units may include one or two diverting diaphragm constructions in the diverting diaphragm construction cavities 122L, 123L of plate 100L and 122U and 123U of plate 100U, one or two pressure regulator cams 124 and 125 in the pressure regulator cavities 126L, 127L, 126U and 127U in the respective plates 100L and 100U and a common comparator diaphragm construction 116 in the comparator diaphragm matching cavities 118L and 118U respectively in the plates 100L and 100U. These components may be connected by channel, passageway and tube constructions on the plates 68, 66, 100L, 100U, 46 and 44 which are shown in FIGURES 20 and 21.

*The air connecting lines in FIGURES 20 and 21 for units 138 and 145*

The air connecting lines shown on FIGURES 20 and 21 indicate the air connections between the various components to produce the limited unit 138 of FIGURE 16 which has components 142 and 146 only and the more comprehensive unit 145 of FIGURE 25 which has the components 142, 144 and 146.

The air connections for the limited unit 138 of FIGURE 16 and the more comprehensive unit 145 of FIGURE 25 will now be described in connection with bellows-like FIGURES 20 and 21 to show how the components 142, 144 and 146 of the non-unit system of FIGURE 23 can be unified into such units 138 and 145.

The unit 138 does not have the temperature sensor component 146 built into the unit 138 and such sensor component is remotely mounted as shown in FIGURES 16 and 17. The unit 145 has such sensor component built into the unit 145, and therefore is a more complete unit.

For the unit 145 of FIGURE 25, air from a source of air supply 170, FIGURE 21, at 15 p.s.i., for example, is supplied through the connective conduit 171 to the tube 76A. From there, the main air connection line 172 passes through a passageway, not shown, in plate 68 to an outlet hole 174 which is connected to the end 176 of channel 177. The air line 172 flows along channel 177 to inlet hole 173 in plate 66. A branch line 172C flows through a passageway, not shown, in plate 66 to outlet hole 175 which is located in cavity 179 under a diaphragm to be described. Another branch air line 172B passes through inlet hole 181 in channel 177 and through a passageway, not shown, in plate 66 to outlet hole 178 at the top of plate 66. The hole 178 will be welded in alignment with inlet hole 180L. The hole 182L of inlet 180L has a restriction or restrictor 184L which changes the pressure air 172B to the sensor controlled reduced pressure air stream 186. The restrictor 184L discharges the reduced air stream 186 through hole 188L under a diaphragm 288, FIGURE 35, in the diaphragm cavity 118L.

The sensor reduced air stream 186 leaves the cavity 118L through hole inlet 190L and is discharged through hole outlet 192L into hole inlet 194 of plate 66. Then the stream 186 passes through a passageway, not shown in plate 66 to outlet hole 196. Then the stream 186 is discharged from hole outlet 196 into channel 198, then into hole inlet 199, then through a passageway in plate 66 and through small tube 70A, which tube passes through holes 346 in plates 100L and 100U and abuts the hole inlet 200 in plate 46. The stream 186 then passes through a passageway, not shown, in plate 46 to the hole outlet 202 which discharges into channel 204. The stream 186 flows along channel 204 to hole inlet 205 in plate 44 and then through the plate 44 to the sensor discharge outlet 206. The sensor controlled ball 208 maintains the pressure of the air stream 186 to correspond to the atmospheric temperature surrounding the bimetal blades 210 and 212 of the sensor 146.

With the air stream connections 170, 172, 172A, 172B, 172C and 186 so fare described it is to be seen that the 15 p.s.i. air stream 170, 172 is divided at opening 173 into three branches 172A, 172B and 172C.

The branch 172B then passes through orifice restrictor 184L and supplies temperature responsive reduced air pressure air stream 186 into the cavity 118L. The reduced pressure air stream 186 then passes through openings 190L, 192L, 194, 196, channel 198, tube 70A, openings 200, 202, channel 204, and openings 205 and 206. At the opening 206 the pressure of the air stream 186 is made responsive by the sensor 146 to atmospheric temperature by the action of the temperature sensing ball 208. The ball 208 is pressed down by the bimetal blades 210 and 212, the blade 210 being secured to plate 44 by screw passing through openings 214 in blade 210 and into threaded openings 216 in plate 44. This action of the reduced pressure air stream 186 is specific to unit 145 and any other units where the sensor 146 is mounted on the plate 44.

However, for the unit 138 of FIGURES 16 and 17, with the sensor 146 being remote from the unit 138, and connected by the outside pipe 148, the previously described channel 198 in plate 66 of FIGURE 21 is replaced by a somewhat different lower channel plate having a channel 218 which extends from the hole outlet 196 to a hole inlet 220 in plate 68, FIGURE 21 which is connected to tube 76B FIGURE 21, and line 148 to sensor 146 of FIGURES 16 and 17.

To accomplish this change, the plate 66 shown in FIGURE 21 is replaced by a substitute plate 66 which has the channel 218 and does not have the channel 198. This prevents the flow of air line 186 to the upper sensor 146 of FIGURE 20 and forces the flow of air line 186 through the substitute channel 218 to the lower remote sensor 146 shown in FIGURE 20.

Otherwise the air flow connections in units 138 of FIGURES 16 and 17 are identical with the air flow connections of unit 145.

Returning to the 15 p.s.i. air pressure line branch 172A at hole 181 of plate 66, FIGURE 21, such branch 172A flows through channel 177 in plate 66 to hole opening 222, then through plate 66 and into tube 70B. The tube 70B passes through holes 346 in plates 100L and 100U and abuts hole 224 in plate 46 where the tube 70B is sonically welded to plate 46. The branch 172A then enters inlet hole 224 in plate 46 against which tube 70B abuts. Then air stream 172A flows through a passageway, not shown, in plate 46 to an outlet hole 225 in channel 226 at the top of plate 46 and along channel 226 to inlet hole 228. Then air line branch 172A passes downward through a passageway, not shown, in plate 46 to outlet hole 230 and to inlet hole 180U in plate 100U. Then an air line branch 172A enters passageway 182U and enters restriction or restrictor 184U where the pressure of air branch 172A is reduced by restrictor 184U to the reduced pressure air line 232 which enters the diaphragm cavity 118U at hole 188U above the diaphragm 288 in such cavity 118U and leaves cavity 118U at outlet hole 190U.

Reduced pressure air line 232 then passes upward through a passage in plate 100U to outlet hole 192U and into inlet hole 234 in plate 46 and up through a passageway, not shown, in plate 46 to outlet hole 236 in channel 238 on plate 46. Then it flows along channel 238 to inlet hole 240. Then it passes through a passageway, not shown, in plate 46 downwardly to outlet hole 242 and into tube 70C, FIGURE 21. The tube 70C passes through holes 346 in plates 100L and 100U and abuts said hole 242. The tube 70C is connected to a passageway, not shown, in plate 66 through which air line 232 passes. Then air line 232 is discharged through outlet hole 244 into channel 246 and along said channel 246 into inlet hole 248 and through a passageway, not shown, in plate 66 and out outlet hole 250 to the cavity 252 under diaphragm 132, FIGURE 22. When the diaphragm 132 rises in response to excess pressure in reduced air line 232, diaphragm 132 uncovers passageway 254 in plate 66 and the excess air is bled out passageway 254, and through outlet hole 256 and out between the unwelded space 258 between plates 66 and 68 to the atmosphere.

From the above description of the flow of reduced air pressure line 232 it is to be seen that the action of the diaphragm 132 in the pressure reducing valve construction shown in FIGURE 22 determines the air pressure in the diaphragm cavity 118U and aids in determining the action of the comparator diaphragm construction further to be described.

The compared pressure air stream 260, FIGURES 20 and 21 is discharged through the outlet opening 262 of the diaphragm cavity 264 in plate 46 and is discharged from the unit 138 or 145, FIGURES 16 or 25, through the tube 76C for any desired purpose. Such air 260 leaves at outlet 262 and passes through plate 46 to outlet 245 in channel 247. Then it leaves channel 247 at outlet 249 and passes through plate 46 to outlet 251. Then it enters tube 70D which abuts outlet 251. The tube 70D passes through holes 346 in plates 100U and 100L and discharges air stream 260 into outlet 253 in channel 255 which covers and discharges into inlet 257 in plate 68. The air stream then passes through a passageway, not shown, in plate 68 and into tube 76C, to be used to control any desired device or system.

For example, the air 260 may be used to control by pipe 265 the regulated flow of heating or cooling liquid, such as water, through the local space heating or cooling unit 266 which may be one of many such units 266 that are connected to a central liquid heater 268 and/or central liquid cooler 270. The pressure responsive water valve 272 is connected to pipe 265 and regulates the volume of flow of liquid through the heat exchanger 274 to maintain the local space substantially in response to the regulated pressure of air stream 260 at the desired temperature. A pump 276 circulates the liquid through the system with the units 266 in parallel with the heater 268 or the cooler 270. Any three way valve construction 278 may be provided to select the heater 268 or cooler 270. An air circulator or blower 280 circulates the air in the local space through the exchanger 274. An electric motor 282 drives the blower under the control of a manual or automatic electric switch 284 which connects and disconnects the electric power supply such as L1, L2.

The unit 145 as above described can be constructed to properly control either a heating liquid flow from the central system or a cooling liquid flow from such system, by proper selection of bimetal blades 210 and 212 and other selections of components as more fully described in the said Kreuter and Mueller application.

For example, the valve 272, FIGURE 21 may be made to modulate and throttle the flow of heating liquid into exchanger 274 as the temperature rises in the space to be heated, and as the pressure of the compared air 260 rises in response thereto, as elsewhere described. This causes the heating action at 274 to be modulated downward to maintain the desired heated condition in the atmospheric air space as long as the water heater 268 supplies hot water.

However, when the water cooler 270 is selected by changing valves 278 to supply cold water to the exchanger 274, a two way valve construction 286 may be provided simultaneously to bypass water valve 272 and to connect valve 272A into the now cold water circuit which then will supply cold water to exchanger 274. The valve 272A may be of the type that modulates and increases the flow of cold water through valve 272A and exchanger 274 as the temperature in the space to be cooled rises.

The valve 272A may be connected to the line 265 by a bypass line 265A which is controlled by a two way bypass valve 265B which connects valve 272A and disconnects valve 272.

In this way, the same thermostat unit 145 may be made to control either a heating exchanger or a cooling exchanger, as desired.

However, the diagrammatic showing of the liquid system which is shown connected to the unit 145 of FIGURES 20 and 21 is only by way of example, and many other different devices and/or systems may be controlled by control unit 145 and other units of this invention.

*Comparison of FIGURES 20, 21, and 23*

FIGURE 23 shows a system with separate components 142, 144 and 146, substantially as shown in said Kreuter and Mueller application. However, a slight change has been made in FIGURE 23 to show the air flow connections in a manner to be more readily compared with the air flow connections in the unitary construction 145 of FIGURES 20, 21 and 25. Similar reference numerals are used where possible in FIGURES 20, 21 and 23 to indicate how the separate components of FIGURE 23 are unified into either of the compact units 138 and 145, according to this invention.

In FIGURE 23, the air supply 170 discharges through conduit 171 to produce air flow 172 which supplies air flow branch 172A which passes restrictor 184U to produce reduced air flow stream 232 that finds its way to inlet 250, cavity 252 and cavity 118U. The pressure of stream 232 is regulated by diaphragm 132, spring 134 and cam 124 with a bleed of excess air through passageway 254 to the atmosphere.

From the above description of FIGURES 20, 21, and 23, it is to be seen that the unit 145 of FIGURE 25 may have the air flow action shown in FIGURES 20 and 21, which has the air flow lines 171, 172, 172A, 172B, 172C, which are relatively high pressure lines having substantially 15 p.s.i. pressure. The sensor controlled air stream line 186 is produced by restriction of line 172B, and the pressure of 186 is controlled by the sensor 146, which varies the discharge at 206 in response to space temperature. The reduced pressure air line 232 is produced by restriction of line 172A, and the pressure of line 232 is determined by the pressure reducing valve 144, and by the adjustment of cam 124 of such valve 144. These air lines act upon the comparator relay or component 142, which is responsive to these various air lines just mentioned, and in response thereto discharges compared reduced air line 260, which is used to control and modulate the flow of a heat exchange liquid to endeavor to maintain the local space temperature at the temperature corresponding to the selection for adjustment of the cam 124 by the user.

In FIGURES 20 and 21 the action of the air flow branch 172A and reduced pressure stream 232 is similar to the action in FIGURE 23. However, the unified structure in FIGURES 20 and 21, which guides these air streams 172A and 232, is entirely different and is a marked improvement over the system of FIGURE 23.

Likewise the air stream 172B in FIGURE 23 flows to the restrictor 184L and is reduced in pressure by such restrictor to stream 186 which enters the diaphragm cavity 118L at 188L and leaves the cavity 118L at outlet 190L and finally has a restricted discharge to the atmosphere at outlet 206 past the ball 208 under the control of bimetal blades 210 and 212.

FIGURES 20 and 21 have a similar action to that of FIGURE 23, produced by the flow of air streams 172B and 186, but the unified structure of FIGURES 20 and 21 is a decided improvement over the system of FIGURE 23.

FIGURE 23 shows the branch air line 172C flowing to diaphragm cavity 179 through the inlet 175. FIGURES 20 and 21 show the same action for the air stream 172C. However, the unified structure of FIGURES 20 and 21 is a decided improvement over the structure of FIGURE 23.

If the bimeal blades 210 and 212 are made to increase the pressure of ball 208 as the temperature of the local space increases, then the pressure of the compared air line 260 at tube 76C proportionally increases in both FIGURE 23 and FIGURES 20 and 21. If the heat exchanger 272 of FIGURE 21 is connected to a heating liquid line then the valve 272 is constructed to throttle the volume of the heating liquid entering the exchanger 274 as the temperature in the space increases and vice versa. Conversely, if the heat exchanger 274 is connected to a cooling liquid line by the change in valves 268, 286 and 265B, then the substituted water valve 272A is constructed to increase the water flow to exchanger 274 as the temperature in the atmospheric space increases, and vice versa.

*The comparator 142*

A comparator or comparator relay component 142 is shown in FIGURE 23, which is also included in the unit 145 of FIGURE 25 and FIGURES 20 and 21, but which is not readily visible in these FIGURES 20, 21, and 25 alone without reference to other figures, such as FIGURE 35.

The main feature of the comparator 142 is the comparator diaphragm construction 116, which includes a relatively large central diaphragm 288, FIGURES 23, 28 and 35, an upper smaller diaphragm 290, a lower smaller diaphragm 292, and a central hub 294. These are all made in one homogeneous comparator diaphragm structure 116. If desired, this structure may have internal metal reinforcements 296, such as shown in FIGURE 35.

The central diaphragm 288 may have its rim 298 sealed between the plates 100U and 100L. The central body of the diaphragm 288 is located between the cavities 118U and 118L in such plates 100U and 100L. The smaller upper diaphragm 290 may have its rim 300 sealed between the plates 46 and 100U. The rim 302 of the smaller lower diaphragm 292 may be sealed between the plates 100L and 66.

The unit 145 of FIGURE 25 and of FIGURES 20 and 21 may have a similar comparator diaphragm structure 116 of FIGURE 35, located in the corresponding cavities and between the corresponding plates, which are similarly numbered, in FIGURES 20, 21 and 35. The upper diaphragm 290 will fit into the cavity 304 on the top surface of plate 100U, FIGURES 20 and 35. The sealing ring 306 on the lower surface of plate 46 may be pressed down onto the diaphragm 290 to seal the rim of such diaphragm 290. In the same manner, the lower smaller diaphragm 292 may fit in the cavity 308 on the lower surface of plate 100L, FIGURES 21 and 35, and the sealing ring 310 may engage such diaphragm 292 and seal the same, when the plates 100L and 100U are welded together.

Referring again to FIGURES 23 and 35, a comparator valve 312 has a semi-spherical lower member 314 which engages the lower end of hub 294 when the valve 312 is in the position of FIGURE 28 when the comparator hub 294 has been pushed down by an excess pressure in the cavity 118U. This seals the hub 294 and prevents any high pressure air from traveling from the cavity 179, FIGURE 28, to the discharge tube 76C. However, when there is an excess pressure in the cavity 118L, as in FIGURE 24, then the hub 294 is pushed up so that the upper end 316 of the valve 312 engages the stationary valve seal 318 and opens up a passageway from the cavity 179, which contains high pressure air, past the valve 312, and past the valve seat 318, and to the discharge tube 76C, so that the discharge air, or compared air, 260, has its pressure modulated to modify the flow of heating or cooling liquid in the liquid system. In the position of FIGURE 23, the valve 312 is in a balanced condition, where no substantial amount of leakage may take place past the semi-spherical part 314 to maintain the pressure 260 at the desired balance. In FIGURE 28, any excess air pressure in tube 76C is relieved by a leakage through the outlet 320 to the atmosphere past the upper end 316 of the valve 312.

In the illustrations of FIGURES 23, 24, and 28, the valve seat 318 is shown as a rubber-like lower end, with a metallic upper screw portion 322, which is threaded to a plate 46. This is the construction in the Kreuter and Mueller application. However, for the purpose of this invention, and in the unit construction 145, 138, etc., a similar valve seat 324 FIGURES 9 and 35 is provided with a lower rubber-like portion 326 and a metal portion 328, which is groove threaded, as shown in FIGURES 9 and 35. The rubber portion 326 may be forced through the threaded opening 330 in the plate 44 FIGURE 9 through the opening 332, which extends down into the cavity 264, FIGURE 20, inside the ring 306. This valve seat receives the upper end 316 of the valve 312 in the same manner as previously described in connection with FIGURES 23, 24, and 28, and permits the screw 328 to be calibrated or turned in the opening 330 of plate 44, as indicated in FIGURE 9.

In the unit 138, which is illustrated in FIGURE 16 in assembled condition, and in exploded view in FIGURE 9, an adjusting knob 334 may be provided for adjusting the cam 124, which will extend out of the opening 336. The knob 334 has a hex opening 338 which receives the head of the cam 124 when the knob 334 is pushed down over the knob 124 which extends out of the opening 336. A pair of flexible snap hooks 340 receive the flange 342 of the knob 334 and hold the knob in place once it has been snapped down between the hooks 334 and onto the hexagonal head of the cam 124. The knob has a pointer 342 which indicates on the scale 344 the desired adjustment of the knob 334. The knob may be removed by spreading apart the hooks 340.

*Sonic weld of mid-plates 100U and 100L to each other and to the channel plates*

The channel plates 46 and 66 may be welded to their respective adjacent mid-plates 100U and 100L by utilizing sonic ridge constructions, such as small circular ridges 98 on the upper face of plate 100U as well as the ridge construction of 180U and 192U. Also similar circular ridge constructions 98 may be provided in the lower face of lower mid-plate 100L as well as by the ridge constructions of 180L and 192L. All of these ridge constructions act in a manner similar to that of the ridges adjacent the channel constructions.

The mid-plates 100L and 100U are made identical under certain conditions of this invention so that they may be combined with a large number of different types of channel plates 46 and 66 to produce a large number of units, each using some of the circuits which are disclosed in this application and also in the application of Kreuter and Mueller, which are not shown in this application.

The plates 100L and 100U are welded together after one of the plates has been rotated about a horizontal axis 180° or has been constructed to have the same relationship, so as to bring the diaphragm cavities 118U and 118L in alignment, as well as other parts of the plates, such as the openings 126U and 126L, and the diverter diaphragm cavities 122L, 122U, 123L, and 123U.

In sonically welding all of the plates of this invention, it is desired to provide ridge-like places on every face to be welded. That is, ridges are to be provided in any one of matching faces, which ridges are to engage relatively flat portions in the other matching face. This is for the purpose of concentrating the sonic welding action at the ridges to provide an effective local weld.

In connection with the plates 100L and 100U, a plurality of ridges 348 are provided on the left half of the upper face of the central plate 100L, as shown in FIGURE 21. However, the right half of the upper face of such plate 100L is left free of any such ridges 348, to provide flat portion for engagement by the respective ridges of the other plate. A sufficient number of such ridges are provided on the left half to insure the action being described. These ridges are visible in FIGURES 20 and 21, as well as in other figures showing this construction. Similar ridges 348 will be provided in the upper plate 100U. However, since this plate has been rotated 180 degrees with respect to plate 100L, the ridges 348 of plate 100U, in FIGURE 20, are all on the right-hand side of the lower face of plate 100U. Therefore, when the two plates are subjected to the sonic action, the ridges 348 all engage flat surfaces of the opposite plate and produce an effective weld. This is also illustrated in FIGURE 32, where the two mid-plates 100U and 100L are shown welded together, with the ridges of the plate 100U on the right-hand side, while the ridges 348 of the plate 100L are on the left-hand side, and with such ridges engaging flat surfaces of the opposite plate. This is an important feature for welding plates that are similar but rotated 180 degrees. Another important feature of this ridge construction is that it can be located around the diaphragm cavities and slightly spaced from such cavities. The rings 298 of the large diaphragm 288 are sealed or secured in channels 350 and the flat parts of the diaphragm are engaged by the inside edges of such grooves 350.

*Day and night control*

FIGURE 26 shows a system in which the compared air stream 260 in tube 76C is changed during the night time in a manner to maintain a different temperature in the controlled space during the night time than is done during the day time. In the system of FIGURE 26, the sensor 146, the comparator 142, and the pressure reducing valve 144 are the same as previously described in connection with FIGURES 20, 21, and 23. However, a diverter component 352 has been added to the system which has a diverter diaphragm construction 120, which may be placed in one of the diverting diaphragm cavities 122L, 122U, 123L, 123U, as shown in FIGURES 9, 20 and 21. The diverter component 352 receives the previous line 232 of FIGURES 23, 20, and 21, and has a branch 353 added that connects the pressure regulator valve 144 with the cavity 118U of the comparator 142. The diverter component 352 is made responsive to a day time pressure of 15 p.s.i. from the source of supply 170 in a manner to connect the pressure regulator 144 with the space 118U. On the other hand, the air supply 170 may also have a night time pressure of 25 p.s.i. controlled manually or by a timer 378 that is distributed throughout the pipe system to produce the air flow lines 171, 172, 172A, 172B, and 172C, as previously described in connection with the FIGURE 23. As long as the pressure from supply 170 remains at day time pressure of 15 p.s.i., for example, the diverter unit 352 allows the pressure line 232 to be connected to the comparator cavity 118U. However, when the night time pressure of 25 p.s.i. is produced at supply 170 and all of the high pressure lines connected thereto, then the diverter unit or component 352 responds to this higher pressure and disconnects the pressure regulating valve 144 which is a day time pressure reducing valve and connects the night time pressure reducing valve 354. The pressure reducing valve 354 may be adjusted by its cam 125 to produce a different reduced pressure 356 on the other side of the restrictor 357 than is produced by the day time valve 144 on the other side of its restrictor 184U.

The diverter diaphragm 120 has a central diaphragm 358 that is held in the lower diverter cavities 122L or 123L, and the upper diverter cavities 122U and 123U. For example, the diaphragm 358 may be placed in cavities 123L and 123U FIGURES 20 and 21. The diverter diaphragm construction also has an upper smaller diverter diaphragm 360 which is held between the plates 100U and 46 in one of the diverter cavities 362U. The diverter diaphragm construction 120 also has a lower smaller diverter diaphragm 364, which is held in the lower smaller diaphragm cavities 366. The diaphragm 120 has a spring 368, which is strong enough to hold the diaphragm construction 120 against the inlet 370 and to open the inlet 372 when the day time 15 p.s.i. pressure prevails in the system, and this allows the pressure valve 144 to maintain its pressure in the comparator unit 142. However, when the 25 p.s.i. night time pressure is produced in the system, then the pressure above the large diaphragm 358 pushes it down and opens the opening 370 and closes the opening 372 so that the night time line 356 can then enter the diverter 352 and pass through the openings 374 down through the hub 376 and down the pipe 353 to the comparator cavity 118U. This produces a different differential action in the comparator 142, which produces a new compared pressure at 260 during the night time, in a manner to maintain preferably a lower temperature in the space being controlled.

FIGURE 27 shows the system of FIGURE 26 in which a timer 378 controls a three-way valve construction 380. The three-way valve of 380 receives the branches 382 and 384 from the air supply 170, which may be at a relatively high pressure, such as 100 p.s.i. or more. The branch 382 has an automatic pressure reducing valve 386, which reduces the pressure to 25 p.s.i. and the branch 384 has a pressure reducing valve 388 that reduces the pressure to 15 p.s.i. The timer 378 operates the three-way valve 380 so that the supply 170 passes only through the branch 384 at 15 p.s.i. during the day time, and passes only through the branch 382 at 25 p.s.i. during the night time, when these varying pressures are transferred through the line 171 to the system 390 of FIGURE 26.

The system of FIGURE 26 may be made into a sonically welded unit having the outer appearance substantially of FIGURE 25. However, the interior construction which has been described in connection with FIGURES 20 and 21 will be varied.

For example, the channel plates 46 and 66 of FIGURES 20 and 21 will be replaced by the channel plates 392 and 394 of FIGURES 36 and 38 respectively. The plate 392, as shown in FIGURE 36, has rear end 396 placed at line 398 in FIGURE 20, and end 400 placed at line 402 of FIGURE 20. The plate 394, FIGURE 38, has its ends 404 and 405 placed respectively at lines 406 and 408 in FIGURE 21.

As FIGURES 20 and 21 show the plates 46 and 66 with their upper and lower surfaces exploded, the reference numerals 398 and 400, FIGURE 20, are applied to the upper surface of plate 46. The reference numerals 406 and 408 are applied to the lower surface of plate 66, FIGURE 21.

The opposite sides of plates 392 and 394, FIGURES 36 and 38 are the same as the sides 392A and 394A of plates 46 and 66 FIGURES 20 and 21 respectively.

FIGURE 39 shows the tubes such as 70B, 70D, etc. which are present both in plate 66 of FIGURE 21 and plate 394 of FIGURE 38.

When the plates 392 and 394 are substituted in FIGURES 20 and 21, as above described, then a sonically welded day and night unit will be produced that can perform the functions of the system 390 of FIGURE 26. Such unit will have substantially the same outside appearance as the unit shown in FIGURE 25. However, the internal structure of such sonically welded unit will have an *internal structure* that is different than the structure disclose din FIGURE 26.

The day and night unit may have a diverter relay, such shown in FIGURE 40, with the main diverter diaphragm 358 of FIGURE 40 placed in the diverter cavities 123U and 123L of FIGURES 20 and 21 respectively. The upper smaller diaphragm 360 of FIGURE 40 may be placed in smaller upper diverter cavity 362U and the smaller lower diaphragm 364 of FIGURE 40 may be placed in the smaller lower diverter cavity 366. The rim of the larger diverter diaphragm 358 will be sealed by the rim pinching structure 410 of the cavities 123U and 123L as illustrated in FIGURE 40 and FIGURES 20 and 21. The rim of the upper smaller diverter diaphragm 360 will be sealed by the pinching ring 412 of the lower surface of plate 46 of FIGURES 20 and 40 which will be the same in the unillustrated side of the substituted plate 392 of FIGURE 36. The rim of the lower smaller diverter diaphragm 364 will be sealed by the pinching ring 414 of FIGURES 21 and 40.

Some of the channels illustrated in the plates 392 and 394 of FIGURES 36 and 38 will be recognized as being counterparts of corresponding channels in plates 46 and 66 of FIGURES 20 and 21. The additional channels shown in FIGURES 36 and 38 are located to cooperate with the additional requirements of the diverter diaphragm construction 120 of FIGURE 40 that has been added to produce the night and day system in the sonically welded unit.

Such sonically welded unit has the additional night pressure reducing valve construction 354 of FIGURE 26 added, as indicated in FIGURE 20 where the dotted geared lever cap 416 and in FIGURE 21 where the dotted adjusting cam 125 indicate how the additional night pressure reducing valve 354 will be incorporated in the sonically welded day and night unit.

With these showings it will be apparent that the system 390 of FIGURE 26 can be incorporated into a sonically welded day and night unit which has the outside appearance of the unit of FIGURE 25 and produces the control of the system of FIGURE 26.

If desired, the system of FIGURE 26 may be embodied in a sonically welded unit having the general appearance of the unit illustrated in FIGURE 16, but having two control knobs 334 to regulate two cams for the two pressure regulating valves 144 and 354 of FIGURE 26. Such a sonically welded unit will have a remote temperature to pressure transducer 146 as illustrated in FIGURE 16.

Substantially all of the additional systems disclosed in said Kreuter and Mueller application may be sonically welded into units according to this invention in view of the disclosures herein made.

FIGURES 29, 30 and 31 indicate diagrammatically the general nature of the systems to be made into sonically welded units according to this invention.

FIGURE 29 illustrates diagrammatically systems disclosed herein and in said Kreuter and Mueller application, such a system may include: a pressure reducing valve 418 such as illustrated in FIGURE 22 and elsewhere in this application; a comparator 420; and a sensor or temperature to pressure transducer 422, all as previously described.

FIGURE 30 illustrates day and night systems otherwise similar to FIGURE 29 which include: two pressure reducing valves 418, one diverting relay 424, one comparator 420 and one sensor 422.

FIGURE 31 illustrates systems including one pressure responsive valve 418, one comparator 420, one sensor 422 and two diverting relays 424. Such a system may be used to change from heating to cooling control, and vice versa, by a change in supply pressure.

It is thus to be seen that a new and useful method procedure and a new and useful product thereof have been provided.

While a form of the invention now preferred has been disclosed as required by statute, many other forms may be used, all coming within the scope of the claimed subject matter.

What is claimed is:
1. A fluid pressure controller comprising:
   upper and lower thermoplastic central plates, upper and lower thermoplastic channel plates, an upper case plate and a lower base plate sonically welded together into a controller unit;
   a comparator relay means in said controller including a comparator diaphragm construction having a central main comparator diaphragm held between said central plates and upper and lower comparator diaphragms respectively held between said upper central plate and upper channel plate and between said lower central plate and said lower channel plate, and a comparator valve construction in said comparator diaphragm construction;
   a pressure regulator valve means in said controller including a diaphragm between said lower central plate and said lower channel plate, and a pressure regulator spring and a pressure regulator cam in said central plates, and upper channel plate, and cam adjusting means on said upper case plate;
   sealed connecting channels respectively on the upper and lower surfaces of said upper and lower channel plates connected with sealed surfaces between said central plates;
   said base plate having a supply fluid transmitting inlet opening means, and a regulated fluid outlet opening means connected with channels in said lower channel plate to receive supply pressure fluid at said opening means and to provide regulated pressure fluid at said outlet means.

2. A fluid pressure controller according to claim 1 including a temperature to pressure transducer means connected with said controller and having a thermostatic exhaust bleed valve connected to a restricted passageway from said supply fluid inlet and connected to a transducer output fluid passageway connected to said comparator relay means.

3. A fluid pressure controller according to claim 2 including a diverting relay means in said controller including a diverting diaphragm construction having a central main diverting diaphragm held between said central plates and upper and lower diverting diaphragms respectively held between said upper central plate and upper channel plate and between said lower central plate and said lower channel plate, and a diverting valve stem construction extending down from said upper diverting diaphragm, said controller having a second pressure regulator valve means similar to said first named pressure regulator valve means.

4. A method of constructing a fluid pressure controller unit comprising:

forming upper and lower thermoplastic central plates, upper and lower thermoplastic channel plates, an upper case plate and a lower base plate, and sonically welding said plates together into said controller unit;

forming and inserting in and between some of said plates a comparator relay means in said controller unit including forming a comparator diaphragm construction having a central main comparator diaphragm held between said central plates and upper and lower comparator diaphragms respectively held between said upper central plate and upper channel plate and between said lower central plate and said lower channel plate, and forming and inserting a comparator valve construction in said comparator diaphragm construction;

forming a pressure regulator valve means in said controller unit including forming and inserting a diaphragm between said lower central plate and said lower channel plate, and forming and inserting a pressure regulator spring and a pressure regulator cam in said central plates, and forming and mounting cam adjusting means on said upper case plate;

forming sealed connecting channels respectively on the upper and lower surfaces of said upper and lower channel plates connected with sealed surfaces between said central plates;

forming said base plate with a supply fluid transmitting inlet opening means and with a regulated fluid outlet opening means and connecting said inlet opening means and said outlet opening means with channels in said lower channel plate to receive supply pressure fluid at said openings means and to provide regulated pressure fluid at said outlet means.

5. A method according to claim 4 including forming a temperature to pressure transducer means and connecting said transducer means with said controller and forming said transducer to have a thermostatic exhaust bleed valve connected to a restricted passageway from said supply fluid inlet and connected to a transducer output fluid passageway connected to said comparator relay means.

6. A method according to claim 5 including forming diverting relay means in said controller and including forming a diverting diaphragm construction having a central main diverting diaphragm held between said central plates and upper and lower diverting diaphragms respectively held between said upper central plate and upper channel plate and between said lower central plate and said lower channel plate, and forming a diverting valve stem construction extending down from said upper diverting diaphragm and forming said controller unit to have a second pressure regulator valve means similar to said first named pressure regulator valve means.

7. A method of constructing a fluid pressure unitary regulator comprising, sonically welding face to face a plurality of thermoplastic plates having substantially flat faces, some of said plates having fluid pressure transmitting passageways through said plates, some of said plates having fluid transmitting channels along some of their said faces, and at least one of said plates having a fluid pressure responsive diaphragm construction in a diaphragm cavity in a face of said plate, said unitary regulator having a fluid pressure transmitting inlet and a controlled fluid pressure outlet, said passageways, said channels, and said diaphragm construction being interconnected in said unitary regulator to contain, control and regulate fluid pressure of fluid from said inlet to said outlet.

8. A method according to claim 7 including producing ridge means on a plate face along the sides of one of said channels and sonically welding said ridge means to an adjacent plate face of an adjacent panel to produce welded bands along the sides of said channel between said adjacent plate faces.

9. A method according to claim 7 including producing pairs of ridges with ridge crests along the sides of said channel to produce said ridge means, and imparting sonic welding vibrations to one of said adjacent panels to produce welding heat at said crests and to produce a melting and welding action in said ridges to produce said welded bands.

10. A method according to claim 9 including producing higher ridge crests on the outer ridges of said pairs of ridges and lower ridge crests on the inner ridges of said pairs of ridges.

11. A method according to claim 8 including producing and sonically welding similar means at the ends of said channel to produce welded bands at the ends of said channel.

12. A method according to claim 7 including producing another diaphragm cavity in an adjacent face of an adjacent plate to receive a portion of said diaphragm construction, and sonically welding portions of said adjacent faces of said adjacent plates to secure portions of said diaphragm construction between said diaphragm cavities.

13. A method according to claim 12 including producing ridge means on one of said adjacent faces adjacent one of said diaphragm cavities for engagement with a flat portion of the other adjacent face, and imparting sonic welding vibrations to one of said adjacent panels to produce welding heat at said ridge means to produce said sonically welded portions of said adjacent faces adjacent said diaphragm cavities.

14. A method according to claim 13 including producing said adjacent plates substantially similar to each other, rotating one of said plates 180° about an axis to produce similar opposed diaphragm cavities, and producing said ridge means on only one half of each of said adjacent faces to engage flat face portions of said adjacent faces.

15. A method according to claim 7 for producing a fluid pressure controller unit comprising:

forming upper and lower thermoplastic central plates, upper and lower thremoplastic channel plates, an upper case plate and a lower base plate, and sonically welding said plates together into said controller unit;

forming and inserting in and between some of said plates a comparator relay means in said controller unit including forming a comparator diaphragm construction having a central main comparator diaphragm held between said central plates and upper and lower comparator diaphragms respectively held between said upper central plate and upper channel plate and between said lower central plate and said lower channel plate, and forming and inserting a comparator valve construction in said comparator diaphragm construction;

forming a pressure regulator valve means in said controller unit including forming and inserting a diaphragm between said lower central plate and said lower channel plate, and forming and inserting a pressure regulator spring and a pressure regulator cam in said central plates, and forming and mounting cam adjusting means on said upper case plate;

forming sealed connecting channels respectively on the upper and lower surfaces of said upper and lower channel plates connected with sealed surfaces between said central plates;

forming said base plate with a supply fluid transmitting inlet opening means and with a regulated fluid outlet opening means and connecting said inlet opening means and said outlet opening means with channels in said lower channel plate to receive supply pressure fluid at said opening means and to provide regulated pressure fluid at said outlet means.

16. A method according to claim 15 including forming a temperature to pressure transducer means and connecting said transducer means with said controller and forming said transducer to have a thermostatic exhaust bleed valve connected to a restricted passageway from said supply fluid inlet and connected to a transducer output fluid passageway connected to said comparator relay means.

17. A method according to claim 16 including forming a diverting relay means in said controller and including forming a diverting diaphragm construction having a central main diverting diaphragm held between said central plates and upper and lower diverting diaphragms respectively held between said upper central plate and upper channel plate and between said lower central plate and said lower channel plate, and forming a diverting valve stem construction extending down from said upper diverting diaphragm and forming said controller unit to have a second pressure regulator valve means similar to said first named pressure regulator valve means.

18. A fluid pressure unitary regulator comprising:
a plurality of sonically welded thermoplastic plates having substantially flat faces and being sonically welded face to face, some of said plates having fluid pressure transmitting passageways through said plates, some of said plates having fluid transmitting channels along some of their faces, and at least one of said plates having a fluid pressure responsive diaphragm construction in a diaphragm cavity in a face of said plate, said unitary regulator having a fluid pressure transmitting inlet and a controlled fluid pressure outlet, said passageways, said channels, and said diaphragm construction being interconnected in said unitary regulator to contain, control and regulate fluid pressure of fluid from said inlet to said outlet.

19. A regulator according to claim 18 including welded bands along the sides of one of said channels between adjacent plate faces in which said welded bands have been produced by forming ridge means on one of said plate faces along the sides of said one of said channels which have been sonically welded to an adjacent plate face of an adjacent panel.

20. A regulator according to claim 19 in which ridge means have been produced by producing pairs of ridges with ridge crests along the said sides of said channel and wherein sonic welding vibrations have been imparted to one of said adjacent panels to produce welding heat at said crests and to produce a melting and welding action in said ridges to produce said welded bands.

21. A regulator according to claim 20 wherein higher ridge crests have been produced on the outer ridges of said pairs of ridges and lower ridge crests have been produced on the inner ridges of said pairs of ridges.

22. A regulator according to claim 19 including welded bands at the ends of said channel by producing and sonically welding similar ridge means at the ends of said channel.

23. A regulator according to claim 18 including another diaphragm cavity in an adjacent face of an adjacent plate receiving a portion of said diaphragm construction, and in which portions of said adjacent faces of said adjacent plates have been sonically welded to secure portions of said diaphragm construction between said diaphragm cavities.

24. A regulator according to claim 23 in which said sonically welded portions of said adjacent faces have been sonically welded by producing ridge means on one of said adjacent faces adjacent one of said diaphragm cavities for engagement with a flat portion of the other adjacent face and wherein sonic welding vibrations have been imparted to one of said adjacent plates to produce welding heat at said ridge means.

25. A regulator according to claim 23 wherein said adjacent plates have been produced substantially similar to each other and one of said plates has been rotated 180° about an axis to produce similar opposed diaphragm cavities, and in which said ridge means has been produced on only one half of each of said adjacent faces to engage flat face portions of said adjacent faces.

26. A regulator according to claim 18 including a fluid pressure controller unit comprising:

upper and lower thermoplastic channel plates, an upper case plate and a lower base plate sonically welded together into a controller unit;

a comparator relay means in said controller including a comparator diaphragm construction having a central main comparator diaphragm held between said tral plates and upper and lower comparator diaphragms respectively held between said upper central plate and upper channel plate and between said lower central plate and said lower channel plate, and a comparator valve construction in said comparator diaphragm construction;

a pressure regulator valve means in said controller including a diaphragm between said lower central plate and said lower channel plate, and a pressure regulator spring and a pressure regulator cam in said central plates, and upper channel plate, and cam adjusting means on said upper case plate;

sealed connecting channels respectively on the upper and lower surfaces of said upper and lower channel plates connected with sealed surfaces between said central plates;

said base plate having a supply fluid transmitting inlet opening means, and a regulated fluid outlet opening means connected with channels in said lower channel plate to receive supply pressure fluid at said opening means and to provide regulated pressure fluid at said outlet means.

27. A regulator according to claim 26 including a temperature to pressure transducer means connected with said controller and having a thermostatic exhaust bleed valve connected to a restricted passageway from said supply fluid inlet and connected to a transducer output fluid passageway connected to said comparator relay means.

28. A regulator according to claim 27 including a diverting relay means in said controller including a diverting diaphragm construction having a central main diverting diaphragm held between said central plates and upper and lower diverting diaphragms respectively held between said upper central plate and upper channel plate and between said lower central plate and said lower channel plate, and a diverting valve stem construction extending down from said upper diverting diaphragm, said controller having a second pressure regulator valve means similar to said first named pressure regulator valve means.

29. A method of sonically welding face to face two thermoplastic plates having substantially flat face portions with one of said plates having a diaphragm receiving cavity in a face of said plate, including producing ridge means on one of said adjacent faces adjacent said diaphragm cavity for engagement with a flat portion of the other adjacent face, placing a diaphragm in said cavity, and imparting sonic welding vibrations to one of said plates to produce welding heat at said ridge means to produce sonically welded portions of said adjacent faces adjacent said diaphragm.

30. A method according to claim 29 which includes producing said adjacent plates substantially similar to each other, rotating one of said plates 180° about an axis to produce opposed similar opposed diaphragm cavities, and producing ridge means on only one half of each of said adjacent cases to engage flat face portions of said adjacent faces.

31. In combination, two thermoplastic plates having substantially flat face portions with one of said plates having a diaphragm receiving cavity in a face of said plate with a diaphragm in said cavity, and in which portions of said adjacent faces have been sonically welded secure portions of said diaphragm between said plates and in which said portions have been welded by producing ridge means on one of said adjacent faces adjacent said diaphragm cavity for engagement with a flat portion of the other adjacent face, and by imparting sonic vibrations to one of said plates to produce welding heat at said ridge means to produce said sonically welded portions.

32. A combination according to claim 31 wherein said adjacent plates have been produced substantially similar to each other and one of said plates has been rotated 180° about an axis to produce similar opposed diaphragm cavities, and in which said ridge means has been produced on only one half of each of said adjacent faces to engage flat face portions of said adjacent faces.

33. In combination, a thermoplastic first outer plate construction, a second thermoplastic plate construction, a thermoplastic intermediate plate construction between said outer plate constructions, said plate constructions being sonically welded together, said intermediate plate construction having a tube receiving opening passing through said intermediate plate construction, a tube secured at its ends to said outer plate constructions, and passing through said opening in said intermediate plate construction, one of said outer plate constructions having an opening extending through said one plate construction connected to the interior of said tube.

34. A combination according to claim 33, the other of said outer plate constructions having another opening extending through said other of said outer plate constructions.

35. A combination according to claim 33, and fluid guiding means guiding fluid flow through said opening.

36. A combination according to claim 35, with another fluid guiding means guiding fluid flowing through said another opening.

37. A combination according to claim 33, one end of said tube being sonically welded to one of said outer plate constructions.

38. A combination according to claim 33, said intermediate plate construction having one or more of said openings, and one or more other tubes passing through said one or more other openings and having their ends connected to said outer plate constructions.

39. A method comprising, sonically welding together a thermoplastic first outer plate construction, a second thermoplastic plate construction, a thermoplastic intermediate plate construction between said outer plate constructions, said plate constructions being sonically welded together, said intermediate plate construction having a tube receiving opening passing through said intermediate plate construction, a tube secured at its ends to said outer plate constructions, and passing through said opening in said intermediate plate construction, one of said outer plate constructions having an opening extending through said one plate construction connected to the interior of said tube.

40. A method according to claim 39, the other of said outer plate constructions having another opening extending through said other of said outer plate constructions.

41. A method according to claim 39, and fluid guiding means guiding fluid flowing through said opening.

42. A method according to claim 41, with another fluid guiding means guiding fluid through said another opening.

43. A method according to claim 39, one end of said tube being sonically welded to one of said outer plate constructions.

44. A method according to claim 39, said intermediate plate construction having one or more of said openings, and one or more other tubes passing through said one or more other openings and having their ends connected to said outer plate constructions.

References Cited

UNITED STATES PATENTS

| | | | |
|---|---|---|---|
| 3,022,814 | 2/1962 | Bodine | 156—73 |
| 3,224,916 | 12/1965 | Soloff | 156—73 |
| 3,245,619 | 4/1966 | Kreuter | 236—82 X |
| 3,338,519 | 8/1967 | Kreuter | 236—82 X |

WILLIAM J. WYE, *Primary Examiner.*

U.S. Cl. X.R.

29—157, 470; 156—73